United States Patent
Li et al.

(10) Patent No.: US 12,120,725 B2
(45) Date of Patent: Oct. 15, 2024

(54) COMMUNICATIONS METHOD AND APPARATUS

(71) Applicant: Huawei Technologies Co., Ltd., Shenzhen (CN)

(72) Inventors: Xiangyu Li, Shenzhen (CN); Xiao Xiao, Shenzhen (CN); Wenjie Peng, Shanghai (CN); Jun Wang, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/485,877

(22) Filed: Sep. 27, 2021

(65) Prior Publication Data

US 2022/0015107 A1   Jan. 13, 2022

Related U.S. Application Data

(63) Continuation of application No. PCT/CN2020/081877, filed on Mar. 27, 2020.

(30) Foreign Application Priority Data

Mar. 28, 2019   (CN) .......................... 201910245337.1

(51) Int. Cl.
   *H04W 72/543*   (2023.01)
   *H04W 4/40*     (2018.01)

(52) U.S. Cl.
   CPC ........... *H04W 72/543* (2023.01); *H04W 4/40* (2018.02)

(58) Field of Classification Search
   CPC ....... H04W 4/40; H04W 72/25; H04W 72/40; H04W 72/543
   See application file for complete search history.

(56) References Cited

U.S. PATENT DOCUMENTS

| 10,757,030 B2 | 8/2020 | Loehr et al. |
| 11,012,886 B2 | 5/2021 | Wang et al. |

(Continued)

FOREIGN PATENT DOCUMENTS

| CN | 108513727 A | 9/2018 |
| CN | 108617010 A | 10/2018 |

(Continued)

OTHER PUBLICATIONS

"3rd Generation Partnership Project; Technical Specification Group Services and System Aspects; Study on user centric identifiers and authentication (Release 16)" 3GPP TR 22.904 V16.1.0, Sep. 2018, 20 pages.

(Continued)

*Primary Examiner* — Brian P Cox
(74) *Attorney, Agent, or Firm* — SLATER MATSIL, LLP

(57) ABSTRACT

A communications system, method and apparatus, the apparatus configured for determining configuration information of a default data radio bearer (DRB) of a first link, the first link being a direct wireless communications link between a first terminal device and another terminal device, and the first terminal device being a transmit end of a first vehicle-to-everything (V2X) data packet, and sending the configuration information of the default DRB of the first link to the first terminal device, where the configuration information of the default DRB of the first link has first indication information, and the first indication information indicating that the configuration information is the configuration information of the default DRB of the first link.

20 Claims, 7 Drawing Sheets

(56) References Cited

U.S. PATENT DOCUMENTS

| | | | |
|---|---|---|---|
| 11,057,753 B2 | 7/2021 | Byun et al. | |
| 2019/0349803 A1 | 11/2019 | Byun et al. | |
| 2020/0178113 A1* | 6/2020 | Jin | H04W 76/11 |

FOREIGN PATENT DOCUMENTS

| | | | |
|---|---|---|---|
| CN | 108990125 A | 12/2018 | |
| CN | 109314841 A | 2/2019 | |
| WO | 2017193258 A1 | 11/2017 | |
| WO | 2018027528 A1 | 2/2018 | |
| WO | 2018066905 A1 | 4/2018 | |
| WO | 2018124810 A1 | 7/2018 | |
| WO | 2018131902 A1 | 7/2018 | |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V0.2.0, Mar. 2019, 29 pages.

"3rd Generation Partnership Project; Technical Specification Group Radio Access Network; E-UTRA and NR; Service Data Adaptation Protocol (SDAP) specification (Release 15)," 3GPP TS 37.324 V15.1.0, Sep. 2018, 13 pages.

"3rd Generation Partnership Project; Technical Specification Group Radio Access Network; NR; Radio Resource Control (RRC) protocol specification(Release 15)," 3GPP TS 38.331 V15.4.0, Dec. 2018, 474 pages.

"On Default DRB, Default QoS Flow and Profile," Agenda item: 10.2.12, Source: Samsung, Document for: Discussion, 3GPP TSG-RAN WG2 #101, R2-1801866, Athens, Greece, (revision of R2-1800116) Feb. 26-Mar. 2, 2018, 4 pages.

"QoS Management for NR V2X," Source: CATT, Agenda Item: 11.4.5, Document for: Discussion and Decision, 3GPP TSG-RAN WG2 Meeting #104, R2-1816899, Spokane, USA, Nov. 12-16, 2018, 5 pages.

"3rd Generation Partnership Project; Technical Specification Group Radio Access Network; NR; NR and NG-RAN Overall Description; Stage 2 (Release 15)," 3GPP TS 38.300 V15.4.0, Dec. 2018, 97 pages.

* cited by examiner

COMMUNICATIONS METHOD AND APPARATUS

CROSS-REFERENCE TO RELATED APPLICATIONS

This application is a continuation of International Application No. PCT/CN2020/081877, filed on Mar. 27, 2020, which claims priority to Chinese Patent Application No. 201910245337.1, filed on Mar. 28, 2019. The disclosures of the aforementioned applications are hereby incorporated by reference in their entireties.

TECHNICAL FIELD

This application relates to the communications field, and in particular, to a communications method and apparatus.

BACKGROUND

Vehicle-to-everything (V2X) is considered to be one of fields with a most industry potential and a most clear market requirement in the internet of things system. FIG. 1 shows a V2X communications architecture, including a first terminal device 11, a second terminal device 12, a network device 13, and a V2X application server 14. The communications system includes two types of communications interfaces: a V2X PC5 interface and a V2X Uu interface. The V2X PC5 interface is a direct communications interface between the first terminal device 11 and the second terminal device 12, and a corresponding direct communications link may be referred to as a sidelink (SL). The V2X Uu interface is a communications interface between the first terminal device 11 or the second terminal device 12 and the network device 13.

For a V2X PC5 interface in long term evolution (LTE) V2X, the first terminal device 11 and the second terminal device 12 do not need to exchange configuration information of an SL data radio bearer (DRB), and a terminal device serving as a receive end may transfer a V2X data packet from a transmit end to a corresponding upper layer protocol stack for processing based on a source layer 2 identifier (source L2 ID), a destination layer 2 identifier (destination L2 ID), and a logical channel identifier (LCH ID).

Different from LTE V2X, in new radio (NR) V2X, an SL DRB may be configured by the network device 13, and the first terminal device 11 and the second terminal device 12 need to exchange configuration information of the SL DRB for unicast communication. If the configuration information of the SL DRB that is stored in the terminal device cannot be used to map a new V2X data packet to a corresponding SL DRB, a service transmission delay on the SL is affected.

SUMMARY

Embodiments of this application provide a communications method and apparatus, to configure a default DRB for a terminal device, so that when a V2X data packet cannot be mapped to a corresponding DRB based on configuration information of the DRB, the V2X data packet is mapped to the default DRB. Therefore, a service transmission delay is not increased.

To achieve the foregoing objective, the following technical solutions are used in the embodiments of this application.

According to a first aspect, a communications method is provided, including: A first terminal device obtains configuration information of a default data radio bearer DRB of a first link, where the first terminal device is a transmit end of a first vehicle-to-everything V2X data packet, and the first link is a direct wireless communications link between the first terminal device and another terminal device. The first terminal device maps the first V2X data packet that meets a preset condition to the default DRB of the first link, where that the preset condition is met includes: the first terminal device fails to map the V2X data packet to a DRB of the first link, where the configuration information of the default DRB of the first link includes first indication information and V2X data packet parameter information corresponding to the default DRB of the first link, and the first indication information is used to indicate that the configuration information is the configuration information of the default DRB of the first link. According to the communications method provided in this embodiment of this application, the first terminal device obtains the configuration information of the default DRB of the first link, and the first terminal device is the transmit end of the first V2X data packet. The first terminal device maps the first V2X data packet that meets the preset condition to the default DRB of the first link. That the preset condition is met includes: the first terminal device fails to map the first V2X data packet to the DRB of the first link. To be specific, when the first terminal device serving as the transmit end fails to map the first V2X data packet to the DRB of the first link, the first terminal device maps the first V2X data packet to the default DRB of the first link, and transmits the first V2X data packet on the default DRB of the first link. A default DRB is configured for a terminal device, so that when the terminal device cannot map a V2X data packet to a corresponding DRB based on configuration information of the DRB, the terminal device maps the V2X data packet to the default DRB. Therefore, the terminal device may not need to interact with a network device to obtain the configuration information of the corresponding DRB, thereby reducing a service transmission delay.

In a possible implementation, that the first terminal device fails to map the V2X data packet to a DRB of the first link includes: The first terminal device cannot obtain same V2X data packet parameter information from a stored DRB mapping rule. The DRB mapping rule includes V2X data packet parameter information corresponding to a DRB, and the DRB of the first link includes a DRB that can be mapped according to the stored DRB mapping rule.

In a possible implementation, that a first terminal device obtains configuration information of a default data radio bearer DRB of a first link includes: The first terminal device receives the configuration information of the default DRB of the first link from a first network device, and/or the first terminal device obtains stored preconfigured configuration information of the default DRB of the first link.

In a possible implementation, a priority of the configuration information of the default DRB of the first link that is received by the first terminal device from the first network device is higher than a priority of the configuration information of the default DRB of the first link that is preconfigured in the first terminal device. In this implementation, the first terminal device may use the configuration information of the default DRB of the first link that is from the first network device to update the configuration information of the default DRB of the first link that is stored in the first terminal device.

In a possible implementation, the configuration information of the default DRB of the first link includes DRB configuration information required by a transmit end of the V2X data packet and/or DRB configuration information required by a receive end of the V2X data packet.

In a possible implementation, that the configuration information of the default DRB of the first link includes DRB configuration information required by a transmit end of the V2X data packet and/or DRB configuration information required by a receive end of the V2X data packet includes: The V2X data packet is a multicast or broadcast data packet, and the configuration information of the default DRB of the first link includes the DRB configuration information required by the transmit end of the V2X data packet, or the V2X data packet is a unicast data packet, and the configuration information of the default DRB of the first link includes the DRB configuration information required by the transmit end of the V2X data packet and the DRB configuration information required by the receive end of the V2X data packet.

In a possible implementation, the method further includes: The first terminal device sends, to a second terminal device, the DRB configuration information required by the receive end of the V2X data packet, or the first terminal device sends, to a second terminal device, the DRB configuration information required by the transmit end of the V2X data packet and the DRB configuration information required by the receive end of the V2X data packet, where the second terminal device is a receive end of the first V2X data packet. In other words, the configuration information of the default DRB of the first link may be used for unidirectional communication and bidirectional communication between the first terminal device and the second terminal device, so that the second terminal device can learn of the DRB configuration information required by the transmit end of the V2X data packet and the DRB configuration information required by the receive end of the V2X data packet.

In a possible implementation, that the first terminal device sends, to a second terminal device, the DRB configuration information required by the receive end of the V2X data packet further includes: The second terminal device receives, based on the default DRB of the first link, the first V2X data packet that meets the preset condition.

In a possible implementation, that the first terminal device sends, to a second terminal device, the DRB configuration information required by the transmit end of the V2X data packet and the DRB configuration information required by the receive end of the V2X data packet further includes: The second terminal device is further a transmit end of a second V2X data packet, and the first terminal device is further a receive end of the second V2X data packet. The second terminal device maps the second V2X data packet that meets the preset condition to the default DRB of the first link. The first terminal device receives, based on the default DRB of the first link, the second V2X data packet that meets the preset condition. In other words, the first terminal device may not only serve as a transmit end of a V2X data packet, but also serve as a receive end of a V2X data packet.

In a possible implementation, the V2X data packet has parameter information, and the parameter information includes at least one of a quality of service (QoS) parameter, type of communication information, destination address identifier information, connection identifier information, and resource configuration mode information.

In a possible implementation, the QoS parameter includes at least one piece of the following information: a QoS flow identifier, a PC5 fifth generation (5G) quality of service identifier (PQI), a vehicle-to-everything quality of service identifier (VQI), a 5G quality of service identifier (5QI), a guaranteed flow bit rate (GFBR), a maximum flow bit rate (MFBR), a minimum required communication range, and an allocation and retention priority (ARP).

In a possible implementation, the QoS parameter, the destination address identifier information, and the type of communication information are parameter information associated with the V2X data packet. The type of communication information includes at least one of broadcast communication, multicast communication, and unicast communication. The connection identifier information is determined by the first terminal device based on the destination address identifier information associated with the V2X data packet. The resource configuration mode information includes a first resource configuration mode and/or a second resource configuration mode. The first resource configuration mode includes: the first network device configures a first link transmission resource for the first terminal device. The second resource configuration mode includes: the first terminal device selects a first link transmission resource.

In a possible implementation, the configuration information of the default DRB of the first link further includes at least one piece of the following information: the first indication information, identification information of the default DRB of the first link, configuration information of protocol layer of the default DRB of the first link, and V2X data packet parameter information corresponding to the default DRB of the first link. The first indication information is used to indicate that the configuration information is the configuration information of the default DRB of the first link.

In a possible implementation, the configuration information of protocol layer of the default DRB of the first link includes at least one of a service data adaptation protocol (SDAP) layer configuration, a packet data convergence protocol (PDCP) layer configuration, a radio link control (RLC) layer configuration, a logical channel (LCH) configuration, and an RLC channel configuration of the default DRB of the first link.

In a possible implementation, that the first terminal device maps the first V2X data packet that meets a preset condition to the default DRB of the first link includes: The first terminal device maps, to the default DRB of the first link, the first V2X data packet that meets the preset condition and that has the V2X data packet parameter information corresponding to the default DRB of the first link. In this implementation, the first V2X data packet can be mapped to the default DRB of the first link only when the first V2X data packet not only meets the preset condition, but also has the V2X data packet parameter information corresponding to the default DRB of the first link.

In a possible implementation, the method further includes: The first terminal device sends, to a second network device, at least one piece of information in the parameter information of the V2X data packet mapped to the default DRB of the first link. In this implementation, the second network device may be triggered to update configuration information of the DRB of the first link in the first terminal device based on the foregoing information.

In a possible implementation, the method further includes: The first terminal device receives a rule of mapping from a V2X data packet to a DRB of the first link and configuration information of the DRB of the first link from the second network device. The rule of mapping from a V2X data packet to a DRB of the first link includes at least one piece of the following information: identification information of the DRB of the first link and V2X data packet parameter information corresponding to the DRB of the first link. The configuration information of the DRB of the first link includes the identification information of the DRB of the first link and configuration information of protocol layer of the DRB of the first link.

According to a second aspect, a communications method is provided, including: A first network device determines configuration information of a default data radio bearer DRB of a first link, where the first link is a direct wireless communications link between a first terminal device and another terminal device, and the first terminal device is a transmit end of a first vehicle-to-everything V2X data packet. The first network device sends the configuration information of the default DRB of the first link to the first terminal device. According to the communications method provided in this embodiment of this application, the first network device may configure the configuration information of the default DRB of the first link in the first terminal device.

In a possible implementation, a priority of the configuration information of the default DRB of the first link that is sent by the first network device to the first terminal device is higher than a priority of configuration information of the default DRB of the first link that is preconfigured in the first terminal device. In this implementation, the first terminal device may use the configuration information of the default DRB of the first link that is from the first network device to update the configuration information of the default DRB of the first link that is stored in the first terminal device.

According to a third aspect, a communications method is provided, including: A second network device receives, from a first terminal device, at least one piece of information in parameter information of a vehicle-to-everything V2X data packet mapped to a default data radio bearer DRB of a first link, where the first terminal device is a transmit end of a V2X data packet, and the first link is a direct wireless communications link between the first terminal device and another terminal device. The second network device determines a rule of mapping from a V2X data packet to a DRB of the first link and configuration information of a DRB of the first link based on at least one piece of information in the parameter information, where the rule of mapping from a V2X data packet to a DRB of the first link includes at least one piece of the following information: identification information of the DRB of the first link and V2X data packet parameter information corresponding to the DRB of the first link, and the configuration information of the DRB of the first link includes the identification information of the DRB of the first link and configuration information of protocol layer of the DRB of the first link. According to the communications method provided in this embodiment of this application, the network device may configure, based on at least one piece of information that is from the first terminal device and that is in the vehicle-to-everything V2X data packet parameter information mapped to the default data radio bearer DRB of the first link, the rule of mapping from a V2X data packet to a DRB of the first link and configuration information of the DRB of the first link for the first terminal device.

In a possible implementation, the method further includes: The second network device sends the rule of mapping from a V2X data packet to a DRB of the first link and the configuration information of the DRB of the first link to the first terminal device.

According to a fourth aspect, a communications method is provided, including: A terminal device obtains configuration information of a default quality of service QoS rule of a first link, where the first link is a direct wireless communications link between the terminal device and another terminal device. The terminal device maps, based on the configuration information, a data packet that is of the first link and that fails to match a QoS rule of the first link to a V2X QoS flow corresponding to the default QoS rule of the first link, where the V2X QoS flow is associated with a QoS parameter. According to the communications method provided in this embodiment of this application, the terminal device obtains the configuration information of the default QoS rule of the first link, and the terminal device maps, based on the configuration information, the data packet that is of the first link and that fails to match the QoS rule of the first link to the V2X QoS flow corresponding to the default QoS rule of the first link. The terminal device does not need to interact with a network device to obtain the configuration information of the corresponding QoS rule. Therefore, a service transmission delay is not increased.

In a possible implementation, the QoS parameter includes at least one piece of the following information: a QoS flow identifier, a PC5 5G quality of service identifier PQI, a vehicle-to-everything quality of service identifier VQI, a 5G quality of service identifier 5QI, a guaranteed flow bit rate GFBR, a maximum flow bit rate MFBR, a minimum required communication range, and an allocation and retention priority ARP.

In a possible implementation, all QoS rules of the first link and the default QoS rule of the first link have priority values, and the default QoS rule of the first link has a largest priority value. In this implementation, when the data packet of the first link cannot match the QoS rule of the first link, the data packet of the first link can always match the default QoS rule of the first link.

In a possible implementation, the default QoS rule of the first link can be used to filter all data packets of the first link, and map the data packets of the first link to the V2X QoS flow corresponding to the default QoS rule of the first link. In this implementation, when the data packet of the first link cannot match the QoS rule of the first link, the data packet of the first link can always match the default QoS rule of the first link.

In a possible implementation, the method further includes: The terminal device sends a QoS parameter to the network device, where the QoS parameter is used by the network device to configure a DRB of the first link and/or a default DRB of the first link for the terminal device, the default DRB of the first link is used to map a V2X QoS flow that meets a preset condition, and that the preset condition is met includes: mapping the V2X QoS flow to the DRB of the first link fails. In this implementation, the network device can configure the DRB of the first link and/or the default DRB of the first link for the terminal device based on the QoS parameter of the QoS flow matching the default QoS rule.

In a possible implementation, the method further includes: The terminal device receives configuration information of the DRB of the first link and/or the default DRB of the first link from the network device. The terminal device maps the V2X QoS flow corresponding to the default QoS rule of the first link to the DRB of the first link and/or the default DRB of the first link.

In a possible implementation, that a terminal device obtains configuration information of a default quality of service QoS rule of a first link includes any one or more of the following: The terminal device obtains the configuration information from a V2X control network element or a core network device, and/or the terminal device obtains stored preconfigured configuration information.

In a possible implementation, a priority of the configuration information obtained by the terminal device from the V2X control network element or the core network device is higher than a priority of the configuration information preconfigured in the terminal device. In this implementation, the terminal device may use the configuration information obtained from the V2X control network element or the core network device to update the preconfigured configuration information.

According to a fifth aspect, a communications method is provided, including: A network device obtains a QoS parameter associated with a vehicle-to-everything V2X quality of service QoS flow, where the V2X QoS flow corresponds to a default QoS rule of a first link, and the V2X QoS flow is used to map a data packet that is of the first link and that fails to match a QoS rule of the first link. The network device configures a data radio bearer DRB of the first link and/or a default DRB of the first link for a terminal device based on the QoS parameter, where the default DRB of the first link is used to map a V2X QoS flow that meets a preset condition, and that the preset condition is met includes: mapping the V2X QoS flow to the DRB of the first link fails, where the first link is a direct wireless communications link between the terminal device and another terminal device. According to the communications method provided in this embodiment of this application, the terminal device obtains the configuration information of the default QoS rule of the first link, and the terminal device maps, based on the configuration information, the data packet that is of the first link and that fails to match the QoS rule of the first link to the V2X QoS flow corresponding to the default QoS rule of the first link. The terminal device does not need to interact with the network device to obtain the configuration information of the corresponding QoS rule. Therefore, a service transmission delay is not increased.

In a possible implementation, the QoS parameter includes at least one piece of the following information: a QoS flow identifier, a PC5 5G quality of service identifier (PQI), a vehicle-to-everything quality of service identifier (VQI), a 5G quality of service identifier (5QI), a guaranteed flow bit rate (GFBR), a maximum flow bit rate (MFBR), a minimum required communication range, and an allocation and retention priority (ARP).

In a possible implementation, that a network device obtains a QoS parameter associated with a vehicle-to-everything V2X quality of service QoS flow includes: The network device receives the QoS parameter from the terminal device, or the network device receives the QoS parameter from a core network device.

In a possible implementation, the data packet of the first link is an internet protocol data packet or an Ethernet data packet.

According to a sixth aspect, a terminal device is provided, including a processing module and a transceiver module, which are configured to perform the communications method in any one of the first aspect or the implementations of the first aspect. For example, the processing module is configured to obtain configuration information of a default data radio bearer DRB of a first link, where the first terminal device is a transmit end of a first vehicle-to-everything V2X data packet, and the first link is a direct wireless communications link between the first terminal device and another terminal device. The processing module is further configured to map the first V2X data packet that meets a preset condition to the default DRB of the first link, where that the preset condition is met includes: the first terminal device fails to map the first V2X data packet to a DRB of the first link.

According to a seventh aspect, a network device is provided, including a processing module and a transceiver module, which are configured to perform the communications method in any one of the second aspect or the implementations of the second aspect. For example, the processing module is configured to determine configuration information of a default data radio bearer DRB of a first link, where the first link is a direct wireless communications link between a first terminal device and another terminal device, and the first terminal device is a transmit end of a first vehicle-to-everything V2X data packet. The transceiver module is configured to send the configuration information of the default DRB of the first link to the first terminal device.

According to an eighth aspect, a network device is provided, including a processing module and a transceiver module, which are configured to perform the communications method in any one of the third aspect or the implementations of the third aspect. For example, the transceiver module is configured to receive, from a first terminal device, at least one piece of information in parameter information of a vehicle-to-everything V2X data packet mapped to a default data radio bearer DRB of a first link, where the first terminal device is a transmit end of a first V2X data packet, and the first link is a direct wireless communications link between the first terminal device and another terminal device. The processing module is configured to determine a rule of mapping from a V2X data packet to a DRB of the first link and configuration information of a DRB of the first link based on at least one piece of information in the parameter information, where the rule of mapping from a V2X data packet to a DRB of the first link includes at least one piece of the following information: identification information of the DRB of the first link and V2X data packet parameter information corresponding to the DRB of the first link, and the configuration information of the DRB of the first link includes the identification information of the DRB of the first link and configuration information of protocol layer of the DRB of the first link.

According to a ninth aspect, a terminal device is provided, including a processing module and a transceiver module, which are configured to perform the communications method in any one of the fourth aspect or the implementations of the fourth aspect. For example, the processing module is configured to obtain configuration information of a default quality of service QoS rule of a first link, where the first link is a direct wireless communications link between the terminal device and another terminal device. The processing module is further configured to map, based on the configuration information, a data packet that is of the first link and that fails to match a QoS rule of the first link to a V2X QoS flow corresponding to the default QoS rule of the first link, where the V2X QoS flow is associated with a QoS parameter.

According to a tenth aspect, a network device is provided, including a processing module and a transceiver module, which are configured to perform the communications method in any one of the fifth aspect or the implementations of the fifth aspect. For example, the processing module is configured to obtain a QoS parameter associated with a vehicle-to-everything V2X quality of service QoS flow, where the V2X QoS flow corresponds to a default QoS rule of a first link, and the V2X QoS flow is used to map a data packet that is of the first link and that fails to match a QoS rule of the first link. The processing module is further configured to configure a data radio bearer DRB of the first link and/or a default DRB of the first link for the terminal device based on the QoS parameter, where the default DRB of the first link is used to map a V2X QoS flow that meets a preset condition, and that the preset condition is met includes: mapping the V2X QoS flow to the DRB of the first link fails, where the first link is a direct wireless communications link between the terminal device and another terminal device.

According to an eleventh aspect, a communications apparatus is provided, including a processor and a memory. The memory is configured to store a program, and the processor invokes the program stored in the memory, so that the communications apparatus is enabled to perform the communications method in any one of the first aspect or the implementations of the first aspect, or perform the communications method in any one of the fourth aspect or the implementations of the fourth aspect.

According to a twelfth aspect, a communications apparatus is provided, including a processor and a memory. The memory is configured to store a program, and the processor invokes the program stored in the memory, so that the communications apparatus is enabled to perform the communications method in any one of the second aspect or the implementations of the second aspect, or perform the communications method in any one of the third aspect or the implementations of the third aspect, or perform the communications method in any one of the fifth aspect or the implementations of the fifth aspect.

According to a thirteenth aspect, a computer-readable storage medium is provided. The computer-readable storage medium stores an instruction. When the instruction is run on a computer or a processor, the computer or the processor is enabled to perform the communications method in any one of the first aspect to the fifth aspect or the possible implementations of the first aspect to the fifth aspect.

According to a fourteenth aspect, a computer program product including an instruction is provided. When the instruction is run on a computer or a processor, the computer or the processor is enabled to perform the communications method in any one of the first aspect to the fifth aspect or the possible implementations of the first aspect to the fifth aspect.

According to a fifteenth aspect, a communications system is provided, including the terminal device in the sixth aspect and the network device in the seventh aspect or the eighth aspect, or including the terminal device in the ninth aspect and the network device in the tenth aspect, or including the communications apparatus in the eleventh aspect and the communications apparatus in the twelfth aspect.

According to a sixteenth aspect, a chip system is provided. The chip system includes a processor, configured to perform the communications method in any one of the first aspect to the fifth aspect or the possible implementations of the first aspect to the fifth aspect.

For technical effects of the sixth aspect to the sixteenth aspect, refer to the content described in the possible implementations of the first aspect to the fifth aspect.

DETAILED DESCRIPTION OF ILLUSTRATIVE EMBODIMENTS

The embodiments of this application are described by using a scenario of a fifth-generation (5G) communications network in a wireless communications network. It should be noted that the solutions in the embodiments of this application may be further applied to another wireless communications network, and a corresponding name may also be replaced with a name of a corresponding function in the another wireless communications network.

The embodiments of this application may be applied to a long term evolution (LTE) system, for example, a narrowband internet of things (NB-IoT) system, or may be applied to a long term evolution-advanced (LTE advanced, LTE-A) system, or may be applied to another wireless communications system, for example, a global system for mobile communications (GSM), a universal mobile telecommunications system (UMTS), a code division multiple access (CDMA) system, or a new network device system.

Figure 1:
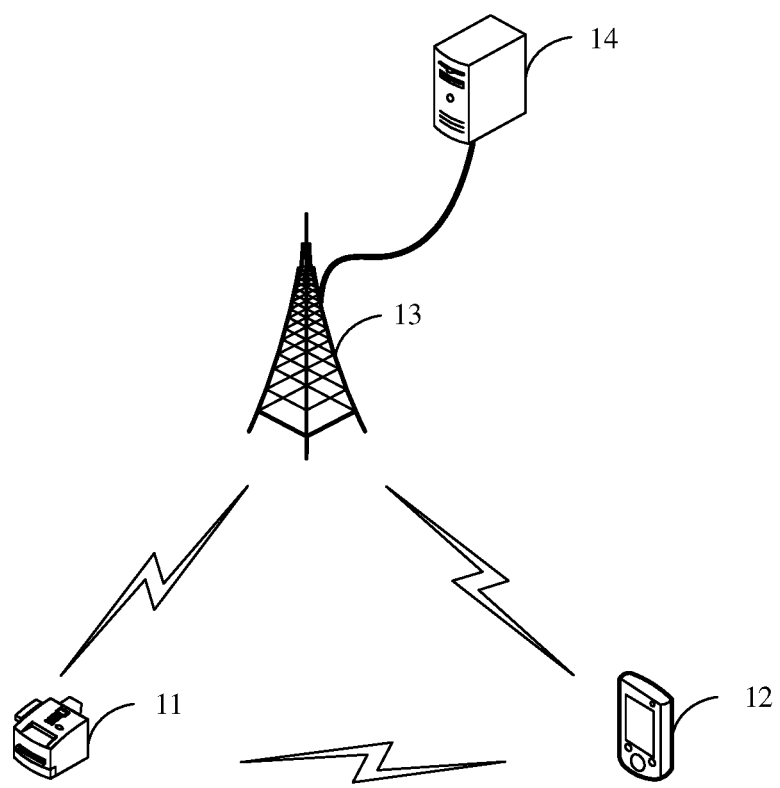
FIG. 1 is a schematic architectural diagram of a vehicle-to-everything system according to an embodiment of this application.
Figure 2:
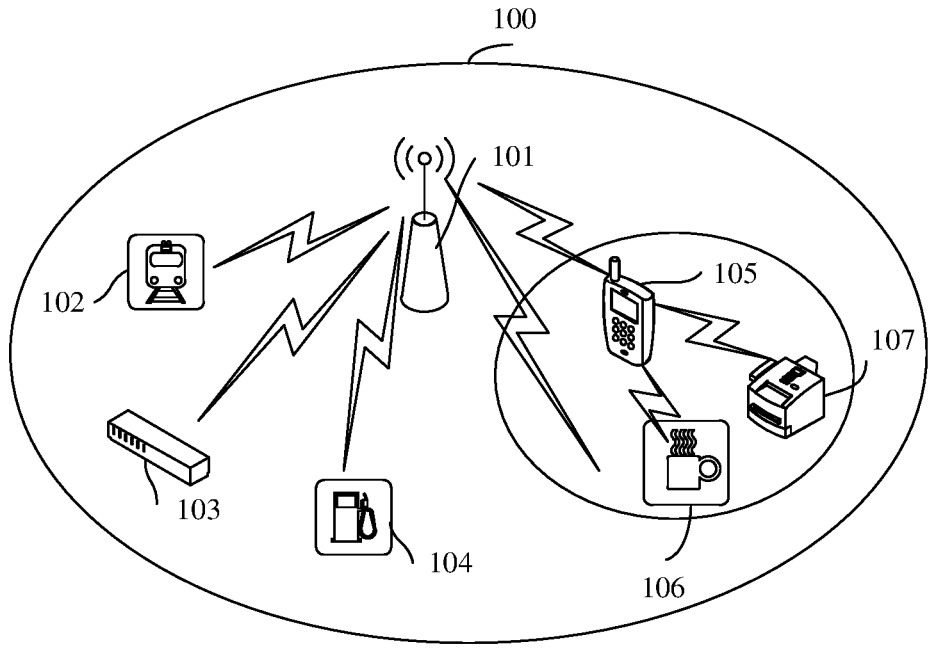
FIG. 2 is a schematic architectural diagram of a communications system according to an embodiment of this application.

FIG. 2 shows a communications system 100 according to an embodiment of this application. The communications system 100 includes a network device 101 and at least two terminal devices 102 to 107. Optionally, the communications system 100 may further include a V2X application server.

The communications system includes two types of communications interfaces: a V2X PC5 interface and a V2X Uu interface. The V2X PC5 interface is a direct communications interface between the terminal devices 102 to 107, and a corresponding direct communications link may be referred to as a sidelink (SL). The V2X Uu interface is a communications interface between the terminal devices 102 to 107 and the network device 101. A terminal device serving as a sender sends V2X data to the network device 101 through the V2X Uu interface, and the network device 101 forwards the V2X data to the V2X application server for processing. Then, the V2X application server sends the V2X data to the network device 101, and the network device 101 sends the V2X data to a terminal device serving as a receiver. In a communication mode based on the V2X Uu interface, the network device 101 for forwarding uplink data and the network device 101 for forwarding downlink data may be a same network device or different network devices. This may be specifically determined by the V2X application server.

The terminal device in this embodiment of this application may be a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal such as a mobile phone (or referred to as a "cellular" phone) or a computer with a mobile terminal, for example, may be a portable, pocket-sized, handheld, computer built-in, or vehicle-mounted mobile apparatus, which exchanges voice and/or data with the radio access network. For example, the wireless terminal is a device such as user equipment (UE), a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a user device, or user equipment. For example, the terminal device may be a high-speed railway communications device 102, a smart air conditioner 103, a smart fuel dispenser 104, a mobile phone 105, a smart teacup 106, or a printer 107. This is not limited in this application.

The network device in this embodiment of this application may be a base station. The base station may be configured to perform conversion between a received over-the-air frame and an internet protocol (IP) packet, and is used as a router between the wireless terminal and a remaining part of the access network. The remaining part of the access network may include an IP network device. The base station may further coordinate attribute management of an air interface. For example, the base station may be a base transceiver station (BTS) in GSM or CDMA, or may be a NodeB in wideband code division multiple access (WCDMA), or may be an evolved NodeB (evolutional NodeB, eNB or e-NodeB) in LTE, or may be a gNB in 5G. This is not limited in this embodiment of this application.

Figure 3:
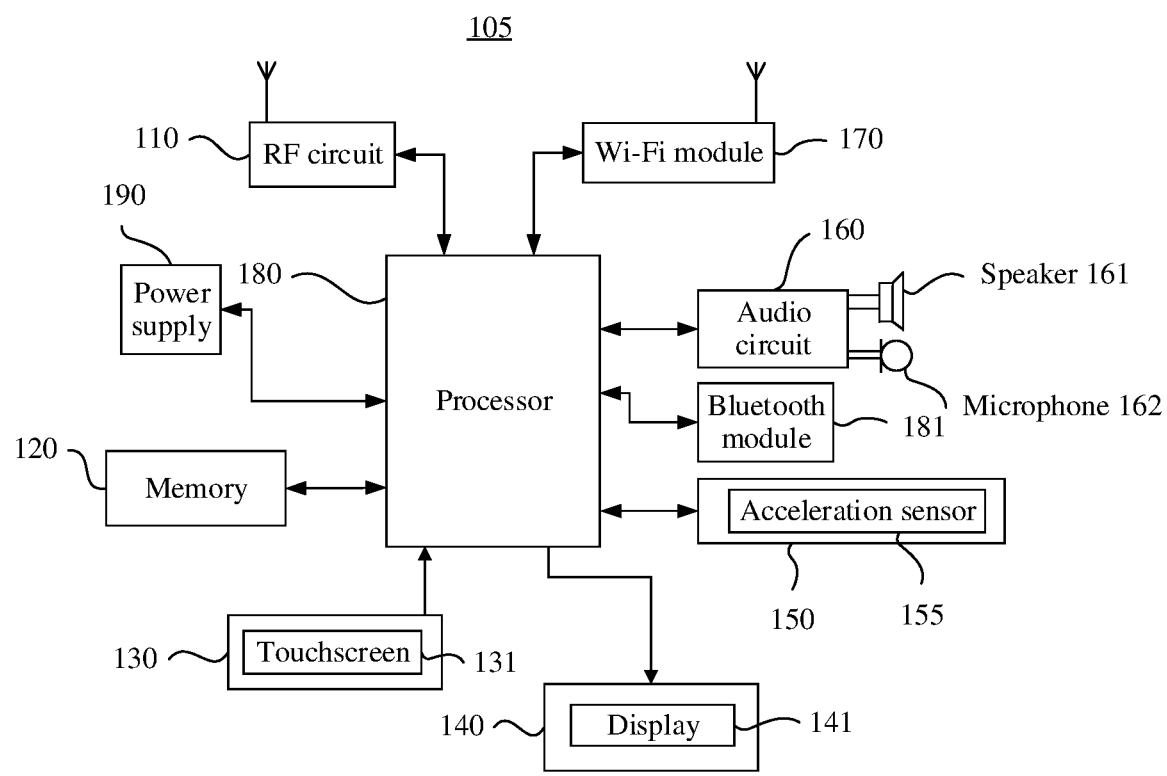
FIG. 3 is a first schematic structural diagram of a terminal device according to an embodiment of this application.

As shown in FIG. 3, a structure of the terminal device is described by using an example in which the terminal device is a mobile phone.

The terminal device 105 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 11o may be configured to receive and send a signal during information receiving and sending or during a call. The RF circuit 11o may receive downlink data from the base station and then deliver the downlink data to the processor 180 for processing, and may send uplink data to the base station. Generally, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to perform various functions of the terminal device 105 and process data. The memory 120 may include a high-speed random access memory, and may further include a nonvolatile memory, for example, at least one magnetic disk storage device, a flash memory, or another nonvolatile solid-state storage device. The memory 120 stores an operating system that supports running of the terminal device 105, for example, an iOS® operating system developed by Apple, an Android® open-source operating system developed by Google, and a Windows® operating system developed by Microsoft. The memory 120 in this application may store the operating system and various application programs, and may further store code for performing the method described in the embodiments of this application.

The input unit 130 (for example, a touchscreen) may be configured to receive input digit or character information, and generate a signal input related to user settings and function control of the terminal device 105. Specifically, the input unit 130 may include a touchscreen 131 disposed on a front facet of the terminal device 105, and may collect a touch operation of a user on or near the touchscreen 131.

The display unit 140 (namely, a display) may be configured to display information entered by the user or information provided for the user, and graphical user interfaces (GUI) of various menus of the terminal device 105. The display unit 140 may include a display 141 disposed on the front facet of the terminal device 105. The display 141 may be configured in a form of a liquid crystal display, a light emitting diode, or the like. The display unit 140 may be configured to display various graphical user interfaces described in this application. The touchscreen 131 may cover the display 141, or the touchscreen 131 may be integrated with the display 141 to implement input and output functions of the terminal device 105. After being integrated, the touchscreen 131 and the display screen 141 may be referred to as a touchscreen for short.

The terminal device 105 may further include at least one sensor 150, for example, a light sensor or a motion sensor. The terminal device 105 may further include another sensor, for example, a gyroscope, a barometer, a hygrometer, a thermometer, or an infrared sensor.

The audio circuit 160, a speaker 161, and a microphone 162 may provide an audio interface between the user and the terminal device 105. The audio circuit 160 may convert received audio data into an electrical signal, and transmit the electrical signal to the speaker 161. The speaker 161 converts the electrical signal into a sound signal for outputting. In addition, the microphone 162 converts a collected sound signal into an electrical signal. The audio circuit 160 receives the electrical signal, converts the electrical signal into audio data, and outputs the audio data to the RF circuit 11o, to send the audio data to, for example, another terminal, or output the audio data to the memory 120 for further processing.

Wi-Fi is a short-distance wireless transmission technology. The terminal device 105 may help the user receive and send an email, browse a web page, access streaming media, and the like through the Wi-Fi module 170. The Wi-Fi module 170 provides wireless broadband internet access for the user.

The processor 180 is a control center of the terminal device 105, is connected to each part of the entire terminal through various interfaces and lines, and performs various functions of the terminal device 105 and processes data by running or executing a software program stored in the memory 120 and by invoking data stored in the memory 120. In some embodiments, the processor 180 may include one or more processing units. An application processor and a baseband processor may be further integrated into the processor 180. The application processor mainly processes an operating system, a user interface, an application program, and the like. The baseband processor mainly processes wireless communication. It may be understood that the baseband processor may alternatively not be integrated into the processor 180. The processor 18o in this application may run the operating system and the application program, perform user interface display, provide a touch response, and perform the communications method in the embodiments of this application.

The Bluetooth module 181 is configured to exchange information with another Bluetooth device with a Bluetooth module by using a Bluetooth protocol. For example, the terminal device 105 may establish a Bluetooth connection to a wearable electronic device (for example, a smartwatch) with a Bluetooth module through the Bluetooth module 181, for data exchange.

The terminal device 105 further includes the power supply 190 (for example, a battery) that supplies power to the components. The power supply may be logically connected to the processor 180 through a power management system, to implement functions such as charging, discharging, and power consumption management through the power management system.

Figure 4:
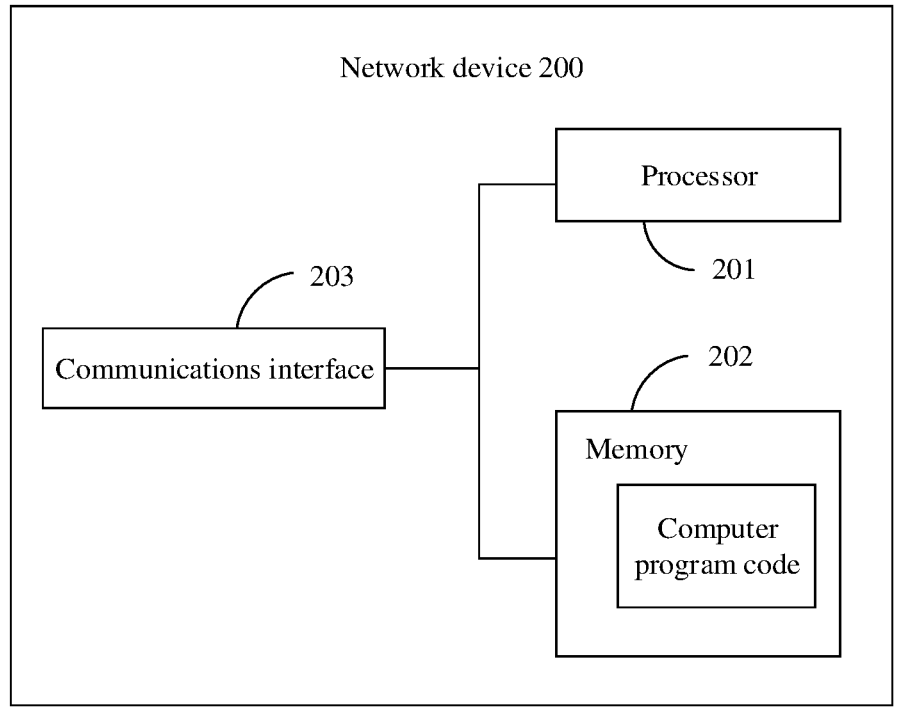
FIG. 4 is a first schematic structural diagram of a network device according to an embodiment of this application.

FIG. 4 is a schematic structural diagram of a network device according to an embodiment of this application. The network device 200 includes at least one processor 201, at least one memory 202, and at least one communications interface 203. The at least one processor 201, the at least one memory 202, and the at least one communications interface 203 may be connected by using a bus.

The memory 202 is configured to store computer program code.

The processor 201 is configured to invoke the computer program code stored in the memory 202, to perform functions of a network device in the following method embodiments.

The communications interface 203 is configured to communicate with another communications apparatus such as a terminal device. The communications interface 203 may perform communication in a wireless communications mode.

In the prior art, in V2X communication, if a terminal device cannot obtain stored configuration information of a DRB, and the configuration information of the DRB can be used to map a V2X data packet flow to a corresponding DRB, the terminal device needs to interact with a network device to obtain configuration information of a corresponding DRB, to map a V2X data packet to a corresponding DRB. Consequently, a service transmission delay is increased. According to the communications method and the terminal device that are provided in the embodiments of this application, configuration information of a default DRB is configured for the terminal device. When the terminal device cannot map a V2X data packet to a corresponding DRB based on configuration information of an existing DRB, the terminal device maps the V2X data packet to the default DRB based on the configuration information of the default DRB, and does not need to interact with a network device to obtain configuration information of the corresponding DRB before transmitting the V2X data packet on the default DRB. Therefore, a service transmission delay is not increased.

Figure 5:
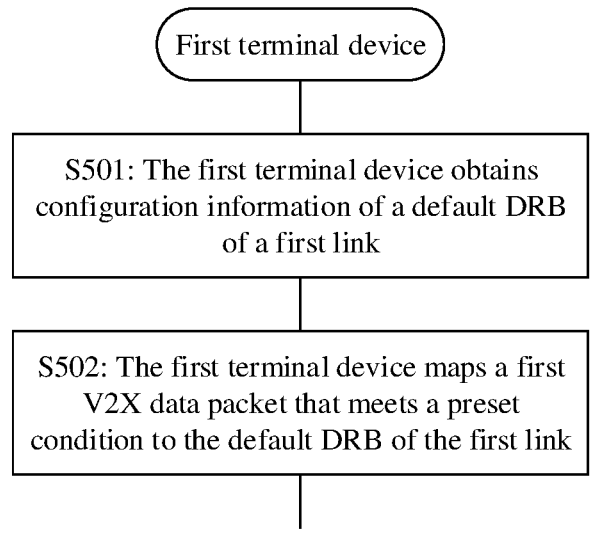
FIG. 5 is a first schematic flowchart of a communications method according to an embodiment of this application.

Specifically, an embodiment of this application provides a communications method, applied to the foregoing system. As shown in FIG. 5, the communications method includes the following steps.

S501: A first terminal device obtains configuration information of a default DRB of a first link.

The first terminal device is a transmit end of a first V2X data packet.

The first V2X data packet is submitted by an upper layer to an access stratum (AS) for transmission. In unicast communication, the V2X data packet is at least one unicast data packet. In broadcast communication or multicast communication, the V2X data packet is at least one broadcast or multicast data packet.

The first link is a direct wireless communications link between the first terminal device and another terminal device. For example, the first link may be a sidelink (SL), and the default DRB of the first link may be a default SL DRB.

The default DRB of the first link is relative to a DRB of the first link.

The DRB of the first link is a DRB that is of the first link and that can be mapped according to a DRB mapping rule configured in the first terminal device, and the DRB mapping rule includes V2X data packet parameter information corresponding to the DRB. The parameter information includes a QoS parameter (for example, a QoS flow identifier such as a QFI or another identifier indicating the V2X data packet), a type of communication (cast type), destination address (destination ID) information, connection identifier (connection ID) information, resource configuration mode information, and the like. Parameter information of the first V2X data packet is matched against the V2X data packet parameter information in the DRB mapping rule, so that a DRB of the first link that corresponds to same parameter information can be obtained. If the first terminal device cannot obtain the same V2X data packet parameter information from the DRB mapping rule configured or stored in the terminal device, the matching fails. In this case, the first V2X data packet is mapped to the default DRB of the first link.

For example, in this application, that matching a V2X data packet or a V2X QoS flow fails may mean that the terminal device does not store a corresponding DRB or QoS rule, or may mean that the terminal device does not obtain any corresponding DRB or QoS rule.

For example, the matching or mapping action in this application may be performed by the terminal device, or may be performed by an upper layer of the terminal device. The upper layer may include at least one of an application (APP) layer, a vehicle-to-everything (V2X) layer, and a non-access stratum (NAS).

For a case in which the configuration information of the default DRB of the first link is configured during connection establishment, when there is a first V2X data packet that needs to be sent at an upper layer of the first terminal device, there is no need to consider whether there is a mapping relationship between a V2X data packet and a DRB of the first link at an AS, and the first V2X data packet at the upper layer is directly submitted to the access stratum (AS). The first terminal device first matches the first V2X data packet against the configured DRB of the first link, and when the matching fails, maps the first V2X data packet to the default DRB of the first link for transmission.

In this embodiment of this application, that the matching fails may also be understood as that a corresponding DRB of the first link is not stored.

The configuration information of the default DRB of the first link further includes at least one piece of the following information: first indication information, identification information of the default DRB of the first link, configuration information of protocol layer of the default DRB of the first link, and V2X data packet parameter information corresponding to the default DRB of the first link.

The following describes the foregoing information in detail.

The first indication information is used to indicate that the configuration information is the configuration information of the default DRB of the first link.

The parameter information includes at least one of a QoS parameter, type of communication information, destination address identifier information, connection identifier information, and resource configuration mode information.

The QoS parameter, the destination address identifier information, and the type of communication information are parameter information associated with the V2X data packet. The type of communication information includes at least one of broadcast communication, multicast communication, and unicast communication. The connection identifier information is determined by the first terminal device based on the destination address identifier information associated with the V2X data packet. The resource configuration mode information includes a first resource configuration mode and/or a second resource configuration mode. The first resource configuration mode includes: The first network device configures a first link transmission resource for the first terminal device. The second resource configuration mode includes: The first terminal device selects a first link transmission resource.

The configuration information of protocol layer of the default DRB of the first link may include at least one of a service data adaptation protocol (SDAP) layer configuration, a packet data convergence protocol (PDCP) layer configuration, a radio link control (RLC) layer configuration, a logical channel (LCH) configuration, and an RLC channel configuration of the default DRB of the first link.

The SDAP layer configuration of the default DRB of the first link may include at least one piece of the following information: a QoS parameter (for example, a QoS flow identifier such as a QFI or another identifier indicating the V2X data packet) mapped to the default DRB of the first link, a type of communication (cast type), destination address (destination ID) information, connection identifier (connection ID) information, resource configuration mode information, and the like. The QoS parameter may include at least one piece of the following information: a QoS flow identifier (QFI), a 5G quality of service identifier (5G QoS identifier, 5QI), a vehicle-to-everything quality of service identifier (V2X QoS identifier, VQI), a PC5 5G quality of service identifier (PC5 QoS identifier, PQI), a guaranteed traffic bit rate (GFBR), a maximum traffic bit rate (MFBR), a minimum required communication distance (minimum required communication range, range), an allocation and retention priority (ARP), and the like. Based on different QoS parameters, V2X data packets may include a V2X data packet (for example, identified by using a PQI) that is not mapped according to the QoS rule and a V2X data packet (for example, identified by using a QFI) that is mapped according to the QoS rule.

Optionally, the first indication information may be located in the SDAP layer configuration of the default DRB of the first link.

The PDCP layer configuration may include at least one piece of the following information: a timer (discard timer) used to control a time for which one PDCP service data unit (SDU) may be stored in a PDCP buffer, a timer (t-Reordering) used to wait for out-of-order data packets in a reordering function, whether data packets can be submitted to an upper layer out of order at a PDCP layer, whether SL data compression is performed at the PDCP layer and a related configuration of the SL data compression (for example, a compression buffer size and a dictionary used for compression), a sequence number (SN) length used for a PDU at the PDCP layer, a security configuration used by a PDCP entity, including whether encryption and/or integrity protection are/is performed, a security algorithm (an integrity protection algorithm and an encryption algorithm), a key, and/or the like used by the PDCP entity, whether a duplication mechanism and a duplication configuration are used by the PDCP, where if the duplication mechanism is used, the PDCP entity corresponds to two or more RLC entities and LCHs, and the duplication mechanism herein means that the PDCP entity duplicates a PDCP protocol data unit (PDU), and submits the PDCP PDU to the two or more associated RLC entities for processing and transmission, and a related configuration of a header compression algorithm at the PDCP layer, for example, whether header compression is performed.

The RLC configuration may include at least one piece of the following information: modes used by an RLC entity, for example, an acknowledged mode (AM), an unacknowledged mode (UM), and a transparent mode (TM) mode.

If the RLC entity serving as a transmit end is configured to use the AM mode, the RLC layer configuration may further include at least one piece of the following information: an SN length of a PDU at an RLC layer, a timer (t-PollRetransmit) for controlling initiation of poll retransmission, a parameter (pollPDU) for controlling initiation of poll after a specific quantity of RLC PDUs are sent, a parameter (pollByte) for controlling initiation of poll after a specific quantity of bytes of the RLC PDU are sent, and a maximum quantity of retransmissions (maxRetxThreshold) at the RLC layer. The poll means that an AM RLC entity serving as a transmit end indicates, by using a poll bit in a MAC PDU, an AM RLC entity serving as a receive end to feed back a status report. Optionally, if an RLC entity serving as a receive end is configured to use the AM mode, the RLC layer configuration may further include at least one piece of the following information: an SN length of a PDU at an RLC layer, a timer (t-Reassembly) for controlling the RLC layer to wait for segmentation, and a timer (t-StatusProhibit) for controlling the RLC layer not to frequently send a status report.

If an RLC entity serving as a transmit end is configured to use the UM mode, the RLC layer configuration further includes at least one piece of the following information: an SN length of a PDU at an RLC layer. If an RLC entity serving as a receive end is configured to use the UM mode, the RLC layer configuration further includes at least one piece of the following information: an SN length of a PDU at an RLC layer, and a timer (t-Reassembly) for controlling the RLC layer to wait for segmentation.

The LCH configuration may include at least one piece of the following information: an LCH identifier, an identifier of a logical channel group to which an LCH belongs, a related parameter (a priority, a prioritized bit rate PBR, or token bucket size duration) for performing logical channel priority processing, information about a carrier that may be used to transmit data on the LCH, information about a resource configuration mode (a mode 1, or a mode 2, or a mode 1 and a mode 2) that may be used to transmit the data on the LCH, numerology information of a resource (for example, a subcarrier spacing, a cyclic prefix length, resource time domain duration, and whether the resource may be a configured grant resource) that may be used to transmit the data on the LCH, a parameter (SR-mask) for controlling whether the LCH can trigger an SR, and a parameter (SR-DelayTimerApplied) for controlling whether the LCH can delay triggering the SR.

In a possible implementation, the first network device may determine the configuration information of the default DRB of the first link, and may further send the configuration information of the default DRB of the first link to the first terminal device. Correspondingly, the first terminal device may receive the configuration information of the default DRB of the first link from the first network device. For example, an example in which the default DRB of the first link is a default SL DRB and the DRB of the first link is an SL DRB is used for description. The first terminal device may send an SL DRB establishment request message to the first network device to request to establish the SL DRB, or the first network receives a QoS profile (the profile includes a QoS parameter corresponding to the V2X data packet of the first terminal device) configured by a core network device. The first network device sends an SL DRB configuration message to the first terminal device to configure configuration information of the SL DRB, and may add the configuration information of the default SL DRB to the message.

In another possible implementation, the first terminal device may store preconfigured configuration information of the default DRB of the first link. Optionally, a device vendor may store the configuration information of the default DRB of the first link in the first terminal device before delivery of the first terminal device, or the first terminal device obtains the configuration information of the default DRB of the first link when accessing a network.

It should be noted that a priority of the configuration information of the default DRB of the first link that is received by the first terminal device from the first network device (or sent by the first network device to the first terminal device) is higher than a priority of the configuration information of the default DRB of the first link that is preconfigured in the first terminal device. For example, the configuration information of the default DRB of the first link that is sent by the first network device may be carried in system information broadcast or RRC dedicated signaling (for example, an RRC reconfiguration message). A priority of configuration information of the default DRB of the first link in the RRC dedicated signaling is higher than a priority of configuration information of the default DRB of the first link in the system information broadcast, and the priority of the configuration information of the default DRB of the first link in the system information broadcast is higher than the priority of the configuration information of the default DRB of the first link that is preconfigured in the first terminal device.

For example, it is assumed that the configuration information of the default DRB of the first link is preconfigured in the first terminal device in an initial state. As a service volume increases, the first network device configures new configuration information of the default DRB of the first link for the first terminal device based on a specific service, the configuration information of the default DRB of the first link that is preconfigured in the first terminal device is overwritten, and the first terminal device uses the new configuration information of the default DRB of the first link that is configured by the first network device.

S502: The first terminal device maps the first V2X data packet that meets a preset condition to the default DRB of the first link.

That the preset condition is met includes: the first terminal device fails to map the first V2X data packet to a DRB of the first link.

Further, the first terminal device may map, to the default DRB of the first link, the first V2X data packet that meets the preset condition and that has the parameter information in step S501.

In other words, the first terminal device may map, to the default DRB of the first link, the first V2X data packet that meets the preset condition and that has the V2X data packet parameter information corresponding to the default DRB of the first link. Subsequently, the first terminal device may implicitly indicate, to the network device, that there is data to be transmitted on the default DRB of the first link.

In addition, a plurality of V2X data packets may be mapped to a same DRB. For example, a plurality of V2X data packets may be mapped to a same default DRB.

It should be noted that step S502 may be implemented at an SDAP layer of the first terminal device.

According to the communications method provided in this embodiment of this application, the first terminal device obtains the configuration information of the default DRB of the first link, and the first terminal device is the transmit end of the first V2X data packet. The first terminal device maps the first V2X data packet that meets the preset condition to the default DRB of the first link. That the preset condition is met includes: the first terminal device fails to map the first V2X data packet to the DRB of the first link. To be specific, when the first terminal device serving as the transmit end fails to map the first V2X data packet to a DRB of the first link, the first terminal device maps the first V2X data packet to the default DRB of the first link, and transmits the first V2X data packet on the default DRB of the first link. A default DRB is configured for a terminal device, so that when the terminal device cannot map a V2X data packet to a corresponding DRB based on configuration information of the DRB, the terminal device maps the V2X data packet to the default DRB. Therefore, the terminal device may not need to interact with a network device to obtain the configuration information of the corresponding DRB, thereby reducing a service transmission delay.

Figure 6:
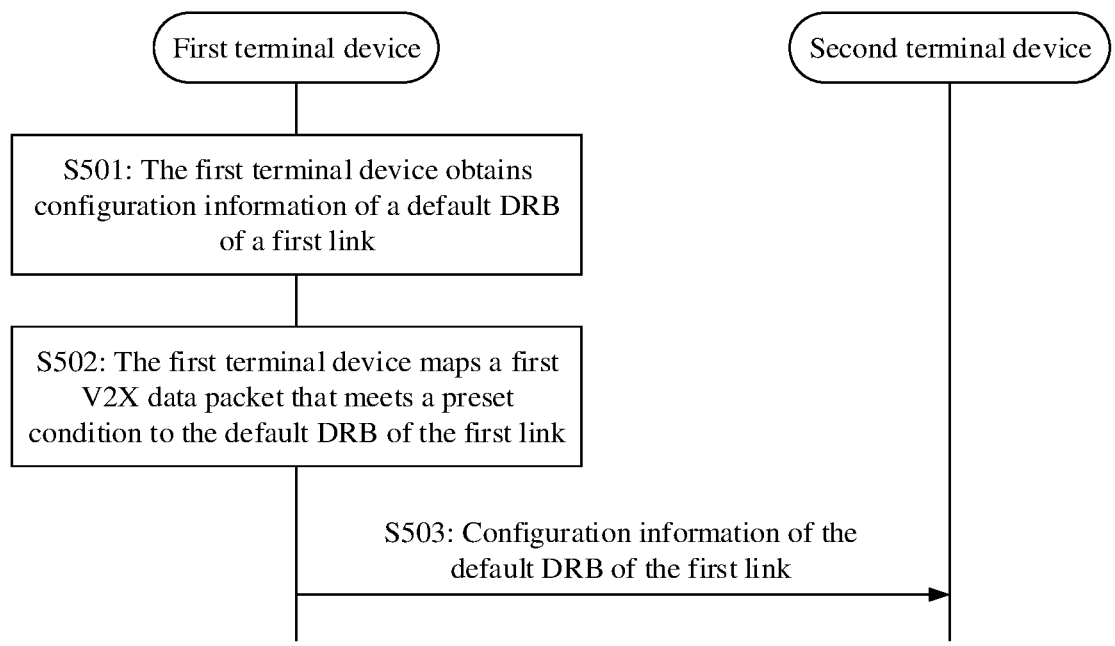
FIG. 6 is a second schematic flowchart of a communications method according to an embodiment of this application.

Optionally, as shown in FIG. 6, the method may further include the following step:

S503: The first terminal device sends the configuration information of the default DRB of the first link to a second terminal device.

The second terminal device is a receive end of the first V2X data packet.

In a possible implementation, when an upper-layer connection is established, the first terminal device may send the configuration information of the default DRB of the first link to the second terminal device by using PC5-S signaling. Correspondingly, the second terminal device may send an acknowledgement message for the configuration information to the first terminal device by using PC5-S signaling.

In another possible implementation, when a radio resource control (RRC) connection is established, the first terminal device may send the configuration information of the default DRB of the first link to the second terminal device by using an RRC connection establishment request message. Correspondingly, the second terminal device may send an acknowledgement message for the configuration information to the first terminal device by using an RRC connection establishment response message. Alternatively, the first terminal device may send the configuration information of the default DRB of the first link to the second terminal device by using an RRC reconfiguration message. Correspondingly, the second terminal device may send an acknowledgement message for the configuration information to the first terminal device by using an RRC reconfiguration response message.

The configuration information of the default DRB of the first link includes DRB configuration information required by a transmit end of the V2X data packet and/or DRB configuration information required by a receive end of the V2X data packet.

Further, the V2X data packet is a multicast or broadcast data packet, and the configuration information of the DRB of the first link includes DRB configuration information required by a transmit end of the V2X data packet. Correspondingly, the first terminal device may send, to the second terminal device, DRB configuration information required by a receive end of the V2X data packet, and the second terminal device may receive, based on the default DRB of the first link, the first V2X data packet that meets the preset condition. Alternatively, the V2X data packet is a unicast data packet, and the configuration information of the default DRB of the first link includes DRB configuration information required by a transmit end of the V2X data packet and DRB configuration information required by a receive end of the V2X data packet. Correspondingly, the first terminal device may send, to the second terminal device, DRB configuration information required by a transmit end of the V2X data packet and DRB configuration information required by a receive end of the V2X data packet, and the second terminal device may map a second V2X data packet that meets the preset condition to the default DRB of the first link. The first terminal device may receive, based on the default DRB of the first link, the second V2X data packet that meets the preset condition.

It should be noted that, for the second terminal device, a priority of the DRB configuration information required by the transmit end of the V2X data packet from the first terminal device and a priority of the DRB configuration information required by the receive end of the V2X data packet from the first terminal device are higher than a priority of the DRB configuration information that is required by the transmit end of the V2X data packet and that is configured in the second terminal device and a priority of the DRB configuration information that is required by the receive end of the V2X data packet and that is configured in the second terminal device. The DRB configuration information that is required by the transmit end of the V2X data packet and that is configured in the second terminal device and the DRB configuration information that is required by the receive end of the V2X data packet and that is configured in the second terminal device may include DRB configuration information that is required by a transmit end of a V2X data packet and that is received by the second terminal device from a third network device and DRB configuration information that is required by a receive end of the V2X data packet and that is received by the second terminal device from the third network device, or may include DRB configuration information that is required by a transmit end of a V2X data packet and that is preconfigured in the second terminal device before delivery and DRB configuration information that is required by a receive end of the V2X data packet and that is preconfigured in the second terminal device before delivery.

Optionally, the second terminal device may alternatively be a transmit end of the second V2X data packet. Correspondingly, the first terminal device may alternatively be a receive end of the second V2X data packet. The second terminal device may map the second V2X data packet that meets the preset condition to the default DRB of the first link. The first terminal device may receive, based on the default DRB of the first link, the second V2X data packet that meets the preset condition.

In other words, the default DRB of the first link between the first terminal device and the second terminal device may be unidirectional or bidirectional. "Bidirectional" means that the default DRB of the first link is valid for both data transmission in a direction from the first terminal device to the second terminal device and data transmission in a direction from the second terminal device to the first terminal device. In this case, the configuration information of the default DRB of the first link that is sent by the first terminal device to the second terminal device includes both a configuration parameter that needs to be known by the first terminal device and a configuration parameter that needs to be known by the second terminal device.

In addition, when the default DRB of the first link is bidirectional, the second terminal device may send the configuration information of the default DRB of the first link to a network device serving the second terminal device. For example, the default DRB of the first link is a default SL DRB. The second terminal device may send, by using an RRC message, the configuration information of the default DRB of the first link to the network device serving the second terminal device. When the default DRB of the first link is unidirectional, the second terminal device does not need to send the configuration information of the default DRB of the first link to the network device serving the second terminal device.

In addition, if the configuration information of the default DRB of the first link that is preconfigured in the first terminal device is common to all terminal devices in a network, the first terminal device and the second terminal device do not need to exchange the configuration information of the default DRB of the first link with each other in unicast communication. Otherwise, the first terminal device and the second terminal device need to exchange the configuration information of the default DRB of the first link with each other on the first link in unicast communication.

Figure 7:
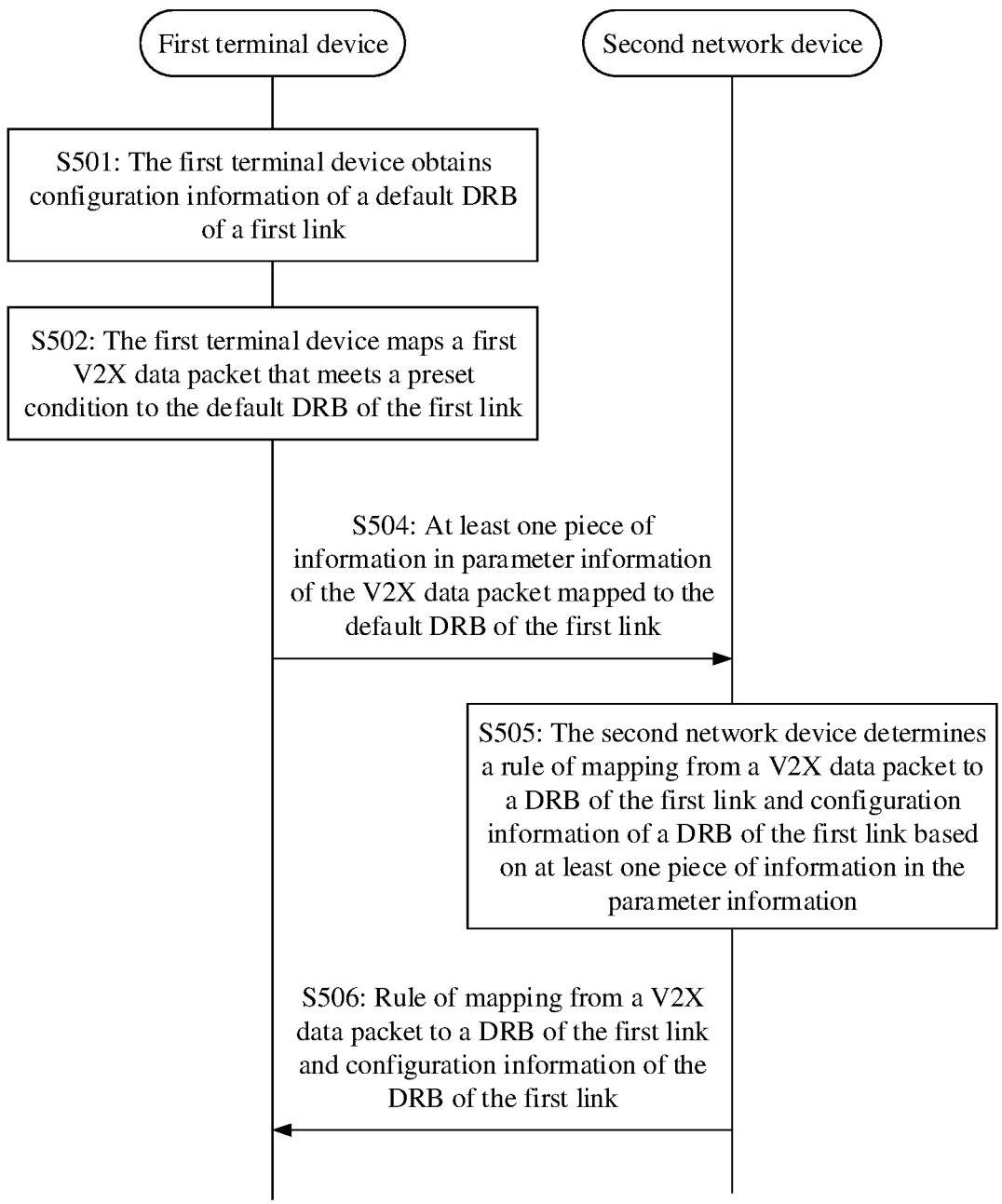
FIG. 7 is a third schematic flowchart of a communications method according to an embodiment of this application.

Optionally, as shown in FIG. 7, the method may further include the following steps.

S504: The first terminal device sends, to a second network device, at least one piece of information in the parameter information of the V2X data packet mapped to the default DRB of the first link.

Correspondingly, the second network device receives, from the first terminal device, the at least one piece of information in the parameter information of the V2X data packet mapped to the default DRB of the first link.

In other words, when there is a V2X data packet to be transmitted on the default DRB of the first link, the first terminal device may report the configuration information of the default DRB of the first link to the second network device, to trigger the second network device to indicate the first terminal device to update configuration information of the DRB of the first link.

S505: The second network device determines a rule of mapping from a V2X data packet to a DRB of the first link and configuration information of the DRB of the first link based on at least one piece of information in the parameter information.

The rule of mapping from a V2X data packet to a DRB of the first link (QoS flow to DRB mapping rule) includes at least one piece of the following information: identification information of the DRB of the first link and V2X data packet parameter information corresponding to the DRB of the first link. The configuration information of the DRB of the first link includes the identification information of the DRB of the first link and configuration information of protocol layer of the DRB of the first link.

The rule of mapping from a V2X data packet to a DRB of the first link and the configuration information of the DRB of the first link may be carried in an RRC message (for example, an SL DRB configuration update message).

S506: The second network device sends the rule of mapping from a V2X data packet to a DRB of the first link and the configuration information of the DRB of the first link to the first terminal device.

Correspondingly, the first terminal device receives the rule of mapping from a V2X data packet to a DRB of the first link and the configuration information of the DRB of the first link from the second network device. The rule of mapping from a V2X data packet to a DRB of the first link and the configuration information of the DRB of the first link are used to update the configuration information of the DRB of the first link that is configured in the first terminal device.

It should be noted that the first network device and the second network device may be a same network device or different network devices.

In V2X communication, if configuration information that can be used to map a V2X QoS flow to a corresponding DRB is not configured for a terminal device, the terminal device needs to interact with a network device to obtain configuration information of a corresponding DRB, to map a V2X QoS flow to a corresponding DRB. Consequently, a service transmission delay is increased. According to the communications method and the terminal device that are provided in the embodiments of this application, configuration information of a default DRB is configured for the terminal device. When the terminal device cannot map a V2X data packet and/or a V2X QoS flow to a corresponding DRB based on configuration information of an existing DRB, the terminal device maps the V2X data packet and/or the V2X QoS flow to the default DRB based on the configuration information of the default DRB, and does not need to interact with a network device to obtain configuration information of the corresponding DRB before transmitting the V2X data packet and/or the V2X QoS flow on the default DRB. Therefore, a service transmission delay is not increased.

Similarly, in V2X communication, if a terminal device does not obtain configuration information of a QoS rule, and the QoS rule can be used to map an internet protocol data packet or an Ethernet data packet to a corresponding V2X QoS flow, the terminal device needs to interact with a network device to obtain configuration information of a corresponding QoS rule, to map an internet protocol data packet or an Ethernet data packet to a corresponding V2X QoS flow. Consequently, a service transmission delay is increased. According to the communications method and the terminal device that are provided in the embodiments of this application, configuration information of a default QoS rule is configured for the terminal device. When the terminal device cannot map an internet protocol data packet or an Ethernet data packet to a corresponding V2X QoS flow based on configuration information of an existing QoS rule, the terminal device maps the internet protocol data packet or the Ethernet data packet to the V2X QoS flow corresponding to the default QoS rule based on the configuration information of the default QoS rule, and does not need to interact with a network device to obtain configuration information of the corresponding QoS rule. Therefore, a service transmission delay is not increased.

Figure 8:
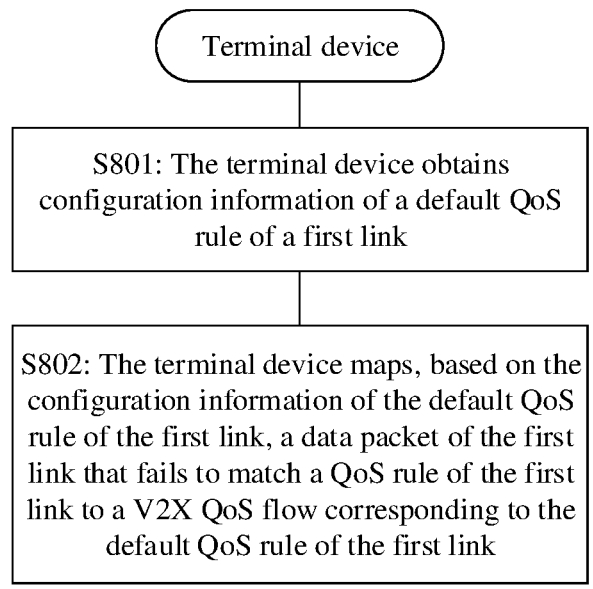
FIG. 8 is a first schematic flowchart of another communications method according to an embodiment of this application.

Specifically, FIG. 8 shows another communications method according to an embodiment of this application. The method includes the following steps.

S801: A terminal device obtains configuration information of a default QoS rule of a first link.

The first link is a direct wireless communications link between the terminal device and another terminal device.

The default QoS rule of the first link is relative to a QoS rule of the first link. Generally, the QoS rule of the first link may be used to filter one data packet of the first link, and map the data packet of the first link to a corresponding V2X QoS flow. However, the default QoS rule of the first link can be used to filter all data packets of the first link, and map the data packets of the first link to a V2X QoS flow corresponding to the default QoS rule of the first link. In other words, the terminal device can always map the data packet of the first link to a V2X QoS flow associated with a QoS parameter.

The configuration information of the default QoS rule of the first link may include: a QoS parameter associated with a V2X QoS flow, a data packet filtering set, and a priority value. The data packet filtering set includes one or more data packet filtering criteria, which are used to select a data packet that is of the first link and that meets a condition. The priority value is a matching priority of a QoS rule. For example, when there are a plurality of QoS rules, the data packet of the first link preferentially matches a QoS rule associated with a lower priority value.

The terminal device may obtain the configuration information of the default QoS rule of the first link in any one or more of the following implementations:

In a possible implementation, the terminal device may obtain the configuration information of the default QoS rule of the first link from a V2X control network element or a core network device. For example, the terminal device may obtain the configuration information of the default QoS rule of the first link from the V2X control network element or the core network device by using an authorization and service configuration procedure (authorization and service provisioning procedure).

In other words, when the terminal device initially accesses a network, the V2X control network element or the core network device configures some policies (policy) for the terminal device. The policies include but are not limited to the configuration information of the default QoS rule of the first link, and may further include a specific carrier that can be used, a specific area in which the terminal device can work, and the like, so that the terminal device can use a V2X service.

In another possible implementation, the terminal device may store preconfigured configuration information of the default QoS rule of the first link. In this case, the terminal device may also be referred to as an upper layer of the terminal device. The upper layer includes at least one of an application (APP) layer, a vehicle-to-everything (V2X) layer, and a non-access stratum (NAS).

It should be noted that a priority of the configuration information of the default QoS rule of the first link that is obtained by the terminal device from the V2X control network element or the core network device is higher than a priority of the configuration information of the default QoS rule of the first link that is preconfigured in the terminal device.

For example, it is assumed that the configuration information of the default QoS rule of the first link is preconfigured in the terminal device in an initial state. As a service volume increases, the V2X control network element or the core network device configures new configuration information of the default QoS rule of the first link for the terminal device based on a specific service, the terminal device uses the new configuration information of the default QoS rule of the first link that is configured by the V2X control network element or the core network device.

S802: The terminal device maps, to the V2X QoS flow corresponding to the default QoS rule of the first link based on the configuration information of the default QoS rule of the first link, a data packet that is of the first link and that fails to match the QoS rule of the first link.

The V2X QoS flow is associated with a QoS parameter.

The data packet of the first link may be an internet protocol (IP) data packet or an Ethernet data packet.

The QoS parameter includes at least one piece of the following information: a QoS flow identifier, a PQI, a VQI, a 5QI, a guaranteed flow bit rate GFBR, an MFBR, a minimum required communication range, an ARP, and the like.

The QoS rule of the first link and the default QoS rule of the first link have priority values, and the default QoS rule of the first link has a largest priority value.

That is, a priority of the default QoS rule of the first link is lower than a priority of the QoS rule of the first link, and the default QoS rule of the first link is usually used for a non-guaranteed bit rate (Non-GBR) service. The priority is a priority that the data packet of the first link matches the QoS rule of the first link or the default QoS rule of the first link.

In this embodiment of this application, that the matching fails may also be understood as that a corresponding QoS rule of the first link is not stored.

According to the communications method provided in this embodiment of this application, the terminal device obtains the configuration information of the default QoS rule of the first link, and the terminal device maps, to the V2X QoS flow corresponding to the default QoS rule of the first link based on the configuration information, the data packet that is of the first link and that fails to match the QoS rule of the first link. The terminal device does not need to interact with a network device to obtain the configuration information of the corresponding QoS rule. Therefore, a service transmission delay is not increased.

Figure 9:
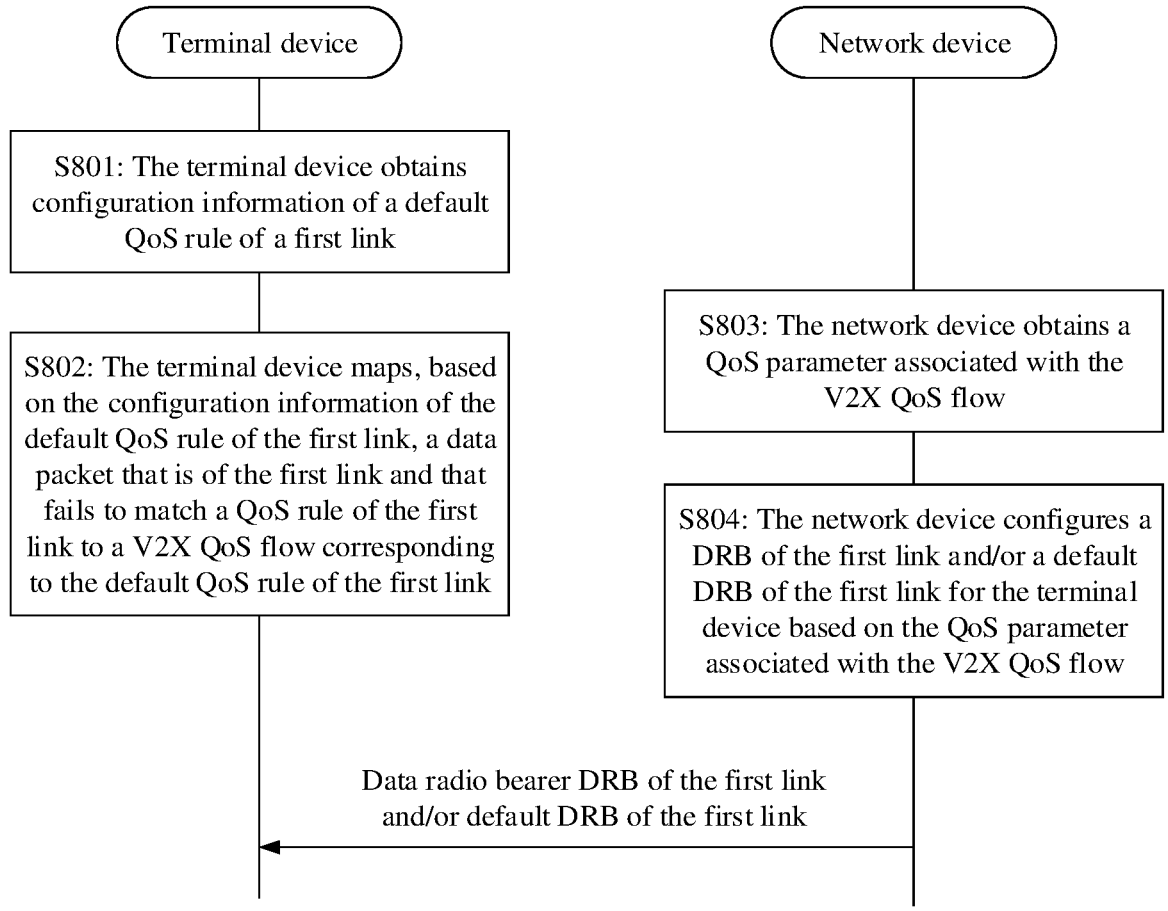
FIG. 9 is a second schematic flowchart of another communications method according to an embodiment of this application.

Optionally, as shown in FIG. 9, the method may further include the following steps.

S803: The network device obtains a QoS parameter associated with the V2X QoS flow.

The V2X QoS flow corresponds to the default QoS rule of the first link, and the V2X QoS flow is used to map the data packet that is of the first link and that fails to match the QoS rule of the first link.

In a possible implementation, the terminal device may send the QoS parameter associated with the V2X QoS flow to the network device. Correspondingly, the network device receives the QoS parameter associated with the V2X QoS flow from the terminal device. For example, the terminal device may send the QoS parameter associated with the V2X QoS flow to the network device in an RRC message (for example, a sidelinkUEinformation message or another newly defined RRC message).

In another possible implementation, the network device receives the QoS parameter associated with the V2X QoS flow from the core network device. For example, the network device receives the QoS parameter associated with the V2X QoS flow from the core network device by using a service authorization procedure.

S804: The network device configures a DRB of the first link and/or a default DRB of the first link for the terminal device based on the QoS parameter associated with the V2X QoS flow.

The default DRB of the first link is used to map the V2X QoS flow that meets a preset condition. That the preset condition is met includes: mapping the V2X QoS flow to a DRB of the first link fails. The first link is a direct wireless communications link between the terminal device and another terminal device.

The network device may send configuration information of the DRB of the first link and/or configuration information of the default DRB of the first link to the terminal device, to complete, by adding the DRB of the first link and/or the default DRB of the first link, the configuration information of the DRB of the first link and/or the configuration information of the default DRB of the first link that are/is configured in the terminal device. Correspondingly, the terminal device receives the configuration information of the DRB of the first link and/or the configuration information of the default DRB of the first link from the network device.

It should be noted that DRBs of the first link and/or default DRBs of the first link that are configured by the network device for different terminal devices may be the same, or may be different for different terminal devices.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between network elements. Correspondingly, an embodiment of this application further provides a communications apparatus, and the communications apparatus is configured to implement the foregoing methods. The communications apparatus may be the terminal device, the first terminal device, or the second terminal device in the foregoing method embodiments, or may be an apparatus including the foregoing terminal device, or may be a component that can be used in the foregoing terminal device. Alternatively, the communications apparatus may be the first network device or the second network device in the foregoing method embodiments, or may be an apparatus including the foregoing network device, or may be a component that can be used in the foregoing network device. It can be understood that, to implement the foregoing functions, the communications apparatus includes a corresponding hardware structure and/or software module for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use a different method to implement the described function for each particular application, but it should not be considered that the implementation goes beyond the scope of this application.

In the embodiments of this application, the communications apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division of the modules is an example and is merely logical function division. During actual implementation, another division manner may be used.

Figure 10:
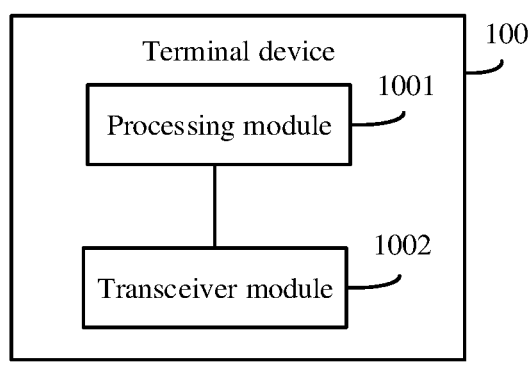
FIG. 10 is a second schematic structural diagram of a terminal device according to an embodiment of this application.

For example, the communications apparatus is the terminal device, the first terminal device, or the second terminal device in the foregoing method embodiments. FIG. 10 is a schematic structural diagram of a terminal device 100. The terminal device 100 includes a processing module 1001 and a transceiver module 1002. The transceiver module 1002 may also be referred to as a transceiver unit, and is configured to implement a sending and/or receiving function, for example, may be a transceiver circuit, a transceiver, or a communications interface.

The processing module 1001 is configured to obtain configuration information of a default data radio bearer DRB of a first link, where the first terminal device is a transmit end of a first vehicle-to-everything V2X data packet, and the first link is a direct wireless communications link between the first terminal device and another terminal device. The processing module 1001 is further configured to map the first V2X data packet that meets a preset condition to the default DRB of the first link, where that the preset condition is met includes: the first terminal device fails to map the first V2X data packet to a DRB of the first link.

Optionally, the transceiver module 1002 is configured to receive the configuration information of a default DRB of the first link from a first network device, and/or the processing module 1001 is further configured to obtain stored preconfigured configuration information of the default DRB of the first link.

Optionally, a priority of the configuration information of the default DRB of the first link that is received by the transceiver module 1002 from the first network device is higher than a priority of the configuration information of the default DRB of the first link that is preconfigured in the processing module 1001.

Optionally, the configuration information of the default DRB of the first link includes DRB configuration information required by a transmit end of the V2X data packet and/or DRB configuration information required by a receive end of the V2X data packet.

Optionally, that the configuration information of the default DRB of the first link includes DRB configuration information required by a transmit end of the V2X data packet and/or DRB configuration information required by a receive end of the V2X data packet includes: The V2X data packet is a multicast or broadcast data packet, and the configuration information of the default DRB of the first link includes the DRB configuration information required by the transmit end of the V2X data packet, or the V2X data packet is a unicast data packet, and the configuration information of the default DRB of the first link includes the DRB configuration information required by the transmit end of the V2X data packet and the DRB configuration information required by the receive end of the V2X data packet.

Optionally, the transceiver module 1002 is further configured to send, to a second terminal device, the DRB configuration information required by the receive end of the V2X data packet, or the first terminal device sends, to a second terminal device, the DRB configuration information required by the transmit end of the V2X data packet and the DRB configuration information required by the receive end of the V2X data packet, where the second terminal device is a receive end of the first V2X data packet.

Optionally, that the transceiver module 1002 of the first terminal device sends, to a second terminal device, the DRB configuration information required by the receive end of the V2X data packet further includes: The transceiver module 1002 of the second terminal device receives, based on the default DRB of the first link, the first V2X data packet that meets the preset condition.

Optionally, that the transceiver module 1002 of the first terminal device sends, to a second terminal device, the DRB configuration information required by the transmit end of the V2X data packet and the DRB configuration information required by the receive end of the V2X data packet further includes: The second terminal device is further a transmit end of a second V2X data packet, and the first terminal device is further a receive end of the second V2X data packet. The processing module 1001 of the second terminal device is further configured to map the second V2X data packet that meets the preset condition to the default DRB of the first link. The transceiver module 1002 of the first terminal device is further configured to receive, based on the default DRB of the first link, the second V2X data packet that meets the preset condition.

Optionally, the V2X data packet has parameter information, and the parameter information includes at least one of a QoS parameter, type of communication information, destination address identifier information, connection identifier information, and resource configuration mode information.

Optionally, the QoS parameter, the destination address identifier information, and the type of communication information are parameter information associated with the V2X data packet. The type of communication information includes at least one of broadcast communication, multicast communication, and unicast communication. The connection identifier information is determined by the first terminal device based on the destination address identifier information associated with the V2X data packet. The resource configuration mode information includes a first resource configuration mode and/or a second resource configuration mode. The first resource configuration mode includes: the first network device configures a first link transmission resource for the first terminal device, and the first resource configuration mode is, for example, a first mode. The second resource configuration mode includes: the first terminal device selects a first link transmission resource, and the second resource configuration mode is, for example, a second mode.

In vehicle-to-everything, in an example of a first terminal device and a second terminal device, an SL communication resource for wireless direct communication between the two terminal devices may be scheduled by a network device. For example, the terminal device is within a coverage area of the network device, and a process of wireless direct communication between the terminal devices is controlled by the network device, and the first terminal device serving as a data transmit end may send a control signal and a data signal to the second terminal device serving as a data receive end on the SL communication resource configured by the network device. Such a mode in which a base station schedules an SL transmission resource may be referred to as a first mode. For example, the network device may schedule a sidelink transmission resource by using downlink control information (DCI), that is, the network device may dynamically schedule the sidelink resource. Alternatively, the network device configures a sidelink transmission resource by using a grant (configured grant), that is, the network device may semi-statically configure the sidelink resource. Optionally, the first mode may be a mode1 resource configuration mode or a mode3 resource configuration mode specified in a current standard formulated by the 3rd generation partnership project (3GPP).

The SL communication resource for wireless direct communication between the first terminal device and the second terminal device may not be scheduled and controlled by the network device, but is determined by the terminal device. For example, the terminal device is within a communication coverage area of the network device, the network device configures an SL resource pool for the terminal device by using a system information block (SIB) message or terminal device dedicated radio resource control (RRC) signaling, and the first terminal device serving as a data transmit end may autonomously obtain an SL communication resource from the SL resource pool to send a control signal and a data signal to the second terminal device serving as a data receive end. Alternatively, for example, the terminal device is beyond a communication coverage area of the network device, and the first terminal device serving as a data transmit end autonomously obtains a sidelink communication resource from a preconfigured SL resource pool to send a control signal and/or a data signal to the second terminal device serving as a data receive end. Optionally, the first terminal device searches an SL resource pool for an appropriate SL communication resource by monitoring a busy/idle channel state, to send a control signal and/or a data signal. Optionally, the first terminal device obtains an appropriate SL communication resource from an SL resource pool by contending with another terminal device, to send a control signal and/or a data signal, and a higher priority of a to-be-transmitted V2X service of the terminal device indicates a greater opportunity that the terminal device contends for the appropriate SL communication resource in the SL resource pool. Optionally, the first terminal device may prestore SL resource pool information, or the network device pre-configures an SL resource pool when the first terminal device accesses a network. Such a mode in which a terminal device autonomously determines an SL transmission resource may be referred to as a second mode. For example, the terminal device senses or contends for a sidelink transmission resource. Optionally, the second mode may be a mode2 resource configuration mode or a mode4 resource configuration mode specified in a current standard formulated by the 3GPP.

Optionally, the configuration information of the default DRB of the first link further includes at least one piece of the following information: the first indication information, identification information of the default DRB of the first link, configuration information of protocol layer of the default DRB of the first link, and the V2X data packet parameter information corresponding to the default DRB of the first link. The first indication information is used to indicate that the configuration information is the configuration information of the default DRB of the first link.

Optionally, the configuration information of protocol layer of the default DRB of the first link includes at least one of a service data adaptation protocol SDAP layer configuration, a packet data convergence protocol PDCP layer configuration, a radio link control RLC layer configuration, a logical channel LCH configuration, and an RLC channel configuration of the default DRB of the first link.

Optionally, the processing module 1001 is specifically configured to map, to the default DRB of the first link, the first V2X data packet that meets the preset condition and that has the V2X data packet parameter information corresponding to the default DRB of the first link.

Optionally, the transceiver module 1002 is further configured to send, to a second network device, at least one piece of information in the parameter information of the V2X data packet mapped to the default DRB of the first link.

Optionally, the transceiver module 1002 is further configured to receive a rule of mapping from a V2X data packet to a DRB of the first link and configuration information of the DRB of the first link from the second network device. The rule of mapping from a V2X data packet to a DRB of the first link includes at least one piece of the following information: identification information of the DRB of the first link and V2X data packet parameter information corresponding to the DRB of the first link. The configuration information of the DRB of the first link includes the identification information of the DRB of the first link and configuration information of protocol layer of the DRB of the first link.

The processing module 1001 is configured to obtain configuration information of a default quality of service QoS rule of a first link, where the first link is a direct wireless communications link between the terminal device and another terminal device. The processing module 1001 is further configured to map, based on the configuration information, a data packet that is of the first link and that fails to match a QoS rule of the first link to a V2X QoS flow corresponding to the default QoS rule of the first link, where the V2X QoS flow is associated with a QoS parameter.

Optionally, the QoS parameter includes at least one piece of the following information: a QoS flow identifier, a PC5 5G quality of service identifier PQI, a vehicle-to-everything quality of service identifier VQI, a 5G quality of service identifier 5QI, a guaranteed flow bit rate GFBR, a maximum flow bit rate MFBR, a minimum required communication range, and an allocation and retention priority ARP.

Optionally, all QoS rules of the first link and the default QoS rule of the first link have priority values, and the default QoS rule of the first link has a largest priority value.

Optionally, the default QoS rule of the first link can be used to filter all data packets of the first link, and map the data packets of the first link to the V2X QoS flow corresponding to the default QoS rule of the first link.

Optionally, the transceiver module 1002 is further configured to send a QoS parameter to the network device, where the QoS parameter is used by the network device to configure a DRB of the first link and/or a default DRB of the first link for the terminal device, the default DRB of the first link is used to map a V2X QoS flow that meets a preset condition, and that the preset condition is met includes: mapping the V2X QoS flow to the DRB of the first link fails.

Optionally, the transceiver module 1002 is further configured to receive configuration information of the DRB of the first link and/or the default DRB of the first link from the network device. The processing module 1001 maps the V2X QoS flow corresponding to the default QoS rule of the first link to the DRB of the first link and/or the default DRB of the first link.

Optionally, that the processing module 1001 is configured to obtain configuration information of a default quality of service QoS rule of a first link includes any one or more of the following: The transceiver module 1002 is further configured to obtain the configuration information from a V2X control network element or a core network device, and/or the processing module 1001 is specifically configured to obtain stored preconfigured configuration information.

Optionally, a priority of the configuration information obtained by the transceiver module 1002 from the V2X control network element or the core network device is higher than a priority of the configuration information preconfigured in the terminal device.

All related content of the steps in the foregoing method embodiments may be cited in function descriptions of corresponding function modules or descriptions on the foregoing method side. Details are not described herein again.

In this embodiment, the terminal device 100 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the terminal device 100 may be in a form of the terminal device 105 shown in FIG. 2.

For example, the processor 18o in the terminal device 105 shown in FIG. 2 may invoke the computer-executable instruction stored in the memory 120, so that the terminal device 105 is enabled to perform the communications method in the foregoing method embodiments.

Specifically, the processor 180 in the terminal device 105 shown in FIG. 3 may invoke the computer-executable instruction stored in the memory 120, to implement functions/implementation processes of the processing module 1001 and the transceiver module 1002 in FIG. 10. Alternatively, the processor 180 in the terminal device 105 shown in FIG. 3 may invoke the computer-executable instruction stored in the memory 120, to implement a function/an implementation process of the processing module 1001 in FIG. 10, and the RF circuit 11o in the terminal device 105 shown in FIG. 3 may implement a function/an implementation process of the transceiver module 1002 in FIG. 10.

The terminal device 105 provided in this embodiment can perform the foregoing communications method. Therefore, for technical effects that can be achieved by the terminal device 105, refer to the foregoing method embodiments. Details are not described herein again.

Figure 11:
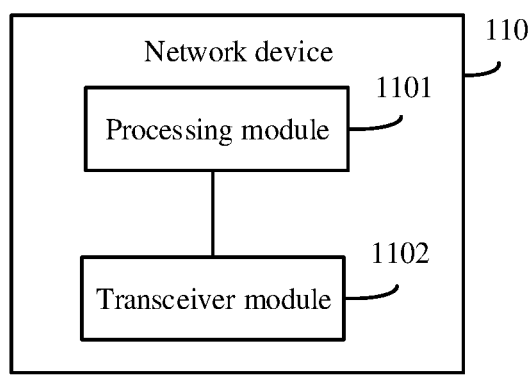
FIG. 11 is a second schematic structural diagram of a network device according to an embodiment of this application.

Alternatively, for example, the communications apparatus is the network device, the first network device, or the second network device in the foregoing method embodiments. FIG. 11 is a schematic structural diagram of a network device 110. The network device 110 includes a processing module 1101 and a transceiver module 1102. The transceiver module 1102 may also be referred to as a transceiver unit, and is configured to implement a sending and/or receiving function, for example, may be a transceiver circuit, a transceiver, or a communications interface.

The processing module 1101 is configured to determine configuration information of a default data radio bearer DRB of a first link, where the first link is a direct wireless communications link between a first terminal device and another terminal device, and the first terminal device is a transmit end of a first vehicle-to-everything V2X data packet. The transceiver module 1102 is configured to send the configuration information of the default DRB of the first link to the first terminal device.

Optionally, a priority of the configuration information of the default DRB of the first link that is sent by the transceiver module 1102 to the first terminal device is higher than a priority of configuration information of the default DRB of the first link that is preconfigured in the first terminal device.

The transceiver module 1102 is configured to receive, from a first terminal device, at least one piece of information in parameter information of a vehicle-to-everything V2X data packet mapped to a default data radio bearer DRB of a first link, where the first terminal device is a transmit end of a first V2X data packet, and the first link is a direct wireless communications link between the first terminal device and another terminal device. The processing module 1101 is configured to determine a rule of mapping from a V2X data packet to a DRB of the first link and configuration information of a DRB of the first link based on at least one piece of information in the parameter information, where the rule of mapping from a V2X data packet to a DRB of the first link includes at least one piece of the following information: identification information of the DRB of the first link and V2X data packet parameter information corresponding to the DRB of the first link, and the configuration information of the DRB of the first link includes the identification information of the DRB of the first link and configuration information of protocol layer of the DRB of the first link.

Optionally, the transceiver module 1102 is further configured to send the rule of mapping from a V2X data packet to a DRB of the first link and the configuration information of the DRB of the first link to the first terminal device.

The processing module 1101 is configured to obtain a QoS parameter associated with a vehicle-to-everything V2X quality of service QoS flow, where the V2X QoS flow corresponds to a default QoS rule of a first link, and the V2X QoS flow is used to map a data packet that is of the first link and that fails to match a QoS rule of the first link. The processing module 1101 is further configured to configure a data radio bearer DRB of the first link and/or a default DRB of the first link for the terminal device based on the QoS parameter, where the default DRB of the first link is used to map a V2X QoS flow that meets a preset condition, and that the preset condition is met includes: mapping the V2X QoS flow to the DRB of the first link fails, where the first link is a direct wireless communications link between the terminal device and another terminal device.

Optionally, the QoS parameter includes at least one piece of the following information: a QoS flow identifier, a PC5 5G quality of service identifier PQI, a vehicle-to-everything quality of service identifier VQI, a 5G quality of service identifier 5QI, a guaranteed flow bit rate GFBR, a maximum flow bit rate MFBR, a minimum required communication range, and an allocation and retention priority ARP.

Optionally, that the processing module 1101 is configured to obtain a QoS parameter associated with a vehicle-to-everything V2X QoS flow includes: The transceiver module 1102 is further configured to receive the QoS parameter from the terminal device.

Optionally, that the processing module 1101 is configured to obtain a QoS parameter associated with a vehicle-to-everything V2X QoS flow includes: The transceiver module 1102 is further configured to receive the QoS parameter from a core network device.

Optionally, the data packet of the first link is an internet protocol data packet or an Ethernet data packet.

All related content of the steps in the foregoing method embodiments may be cited in function descriptions of corresponding function modules or descriptions on the foregoing method side. Details are not described herein again.

In this embodiment, the network device 11o is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the network device 11o may be in a form of the network device 200 shown in FIG. 4.

For example, the processor 201 in the network device 200 shown in FIG. 4 may invoke the computer-executable instruction stored in the memory 202, so that the network device 200 is enabled to perform the communications method in the foregoing method embodiments.

Specifically, the processor 201 in the network device 200 shown in FIG. 4 may invoke the computer-executable instruction stored in the memory 202, to implement functions/implementation processes of the processing module 1101 and the transceiver module 1102 in FIG. 11. Alternatively, the processor 201 in the network device 200 shown in FIG. 4 may invoke the computer-executable instruction stored in the memory 202, to implement a function/an implementation process of the processing module 1101 in FIG. 11, and the communications interface 203 in the network device 200 shown in FIG. 4 may implement a function/an implementation process of the transceiver module 1102 in FIG. 11.

The network device 110 provided in this embodiment can perform the foregoing communications method. Therefore, for technical effects that can be achieved by the network device 200, refer to the foregoing method embodiments. Details are not described herein again.

An embodiment of this application further provides a communications apparatus, including a processor and a memory. The memory is configured to store a program, and the processor invokes the program stored in the memory, so that the communications apparatus is enabled to perform the communications method performed by the terminal device, the first terminal device, or the second terminal device in FIG. 5 to FIG. 9.

An embodiment of this application further provides a communications apparatus, including a processor and a memory. The memory is configured to store a program, and the processor invokes the program stored in the memory, so that the communications apparatus is enabled to perform the communications method performed by the network device, the first network device, or the second network device in FIG. 5 to FIG. 9.

An embodiment of this application further provides a computer-readable storage medium. The computer-readable storage medium stores an instruction. When the instruction is run on a computer or a processor, the computer or the processor is enabled to perform the communications method performed by the terminal device, the first terminal device, or the second terminal device in FIG. 5 to FIG. 9, or the network device, the first network device, or the second network device in FIG. 5 to FIG. 9.

An embodiment of this application further provides a computer program product including an instruction. When the instruction is run on a computer or a processor, the computer or the processor is enabled to perform the communications method performed by the terminal device, the first terminal device, or the second terminal device in FIG. 5 to FIG. 9, or the network device, the first network device, or the second network device in FIG. 5 to FIG. 9.

An embodiment of this application provides a chip system. The chip system includes a processor, configured to perform the communications method performed by the terminal device, the first terminal device, or the second terminal device in FIG. 5 to FIG. 9. For example, the first terminal device obtains configuration information of a default data radio bearer DRB of a first link, where the first terminal device is a transmit end of a first vehicle-to-everything V2X data packet, and the first link is a direct wireless communications link between the first terminal device and another terminal device. The first terminal device maps the first V2X data packet that meets a preset condition to the default DRB of the first link, where that the preset condition is met includes: the first terminal device fails to map the V2X data packet to a DRB of the first link.

In a possible design, the chip system further includes a memory. The memory is configured to store a program instruction and data that are necessary for the terminal device. The chip system may include a chip and an integrated circuit, or may include a chip and another discrete device. This is not specifically limited in this embodiment of this application.

An embodiment of this application provides a chip system. The chip system includes a processor, configured to perform the communications method performed by the network device, the first network device, or the second network device in FIG. 5 to FIG. 9. For example, the first network device determines configuration information of a default data radio bearer DRB of a first link, where the first link is a direct wireless communications link between a first terminal device and another terminal device, and the first terminal device is a transmit end of a first vehicle-to-everything V2X data packet. The first network device sends the configuration information of the default DRB of the first link to the first terminal device.

In a possible design, the chip system further includes a memory, and the memory is configured to store a program instruction and that are necessary for the network device. The chip system may include a chip and an integrated circuit, or may include a chip and another discrete device. This is not specifically limited in this embodiment of this application.

The communications apparatus, the computer storage medium, the computer program product, or the chip system provided in this application is configured to perform the foregoing communications method. Therefore, for beneficial effects that can be achieved, refer to the beneficial effects in the foregoing implementations. Details are not described herein again.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that units and algorithm steps in the examples described with reference to the embodiments disclosed in this application can be implemented by electronic hardware or a combination of electronic hardware and computer software. Whether the functions are performed by hardware or software depends on particular applications and design constraints of the technical solutions. A person skilled in the art may use a different method to implement the described function for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms The units described as separate components may or may not be physically separate, and components displayed as units may or may not be physical units, in other words, may be located at one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications device, comprising:
    at least one processor, and
    one or more non-transitory computer readable memories coupled to the at least one processor and storing programming instructions for execution by the at least one processor to operate as a first terminal device or as an apparatus disposed in the first terminal device, the programming instructions including instructions for:
        obtaining configuration information of a default data radio bearer (DRB) of a first link, the first terminal device being a transmit end of a first vehicle-to-everything (V2X) data packet, and the first link being a direct wireless communications link between the first terminal device and another terminal device, wherein the configuration information of the default DRB of the first link comprises V2X data packet parameter information corresponding to the default DRB of the first link, wherein the parameter information comprises a type of communication; and
        mapping a first V2X data packet that meets a preset condition to the default DRB of the first link, wherein the preset condition being met comprises the first terminal device not storing a DRB of the first link that corresponds to the first V2X data packet;
        wherein the configuration information of the default DRB of the first link comprises first indication information, and wherein the first indication information indicates that the configuration information is the configuration information of the default DRB of the first link.

2. The device according to claim 1, wherein the first terminal device not storing the DRB of the first link that corresponds to the first V2X data packet comprises the first terminal device being unable to obtain same V2X data packet parameter information from a stored DRB mapping rule;
    wherein the DRB mapping rule comprises V2X data packet parameter information corresponding to a DRB, and wherein the DRB of the first link comprises a DRB that can be mapped according to the stored DRB mapping rule.

3. The device according to claim 1, wherein the instructions for obtaining the configuration information of the default data radio bearer (DRB) of the first link include instructions for performing at least one of:
    receiving the configuration information of the default DRB of the first link from a first network device; or
    obtaining stored preconfigured configuration information of the default DRB of the first link.

4. The device according to claim 3, wherein the configuration information of the default DRB of the first link from the first network device is carried in system information broadcast or radio resource control (RRC) dedicated signaling, and wherein a priority of configuration information of the default DRB of the first link in the RRC dedicated signaling is higher than a priority of configuration information of the default DRB of the first link in the system information broadcast.

5. The device according to claim 1, wherein the configuration information of the default DRB of the first link comprises DRB configuration information required by a transmit end of the V2X data packet and further comprises DRB configuration information required by a receive end of the V2X data packet, and wherein a second terminal device is a receive end of the first V2X data packet.

6. The device according to claim 5, wherein the V2X data packet is a unicast data packet, and wherein the configuration information of the default DRB of the first link comprises the DRB configuration information required by the transmit end of the V2X data packet and required by the receive end of the V2X data packet.

7. The device according to claim 1, wherein the type of communication comprises at least one of broadcast communication, multicast communication, or unicast communication.

8. The device according to claim 1, wherein the configuration information of the default DRB of the first link comprises V2X data packet parameter information corresponding to the default DRB of the first link, wherein the parameter information comprises a quality of service (QOS) parameter, and wherein the QoS parameter comprises at least one of a QoS flow identifier, a PC5 5G quality of service identifier (PQI), a vehicle-to-everything quality of service identifier (VQI), a 5G quality of service identifier (5QI), a guaranteed flow bit rate (GFBR), a maximum flow bit rate (MFBR), a minimum required communication range, or an allocation and retention priority (ARP).

9. The device according to claim 1, wherein the configuration information of the default DRB of the first link further comprises at least one of identification information of the default DRB of the first link or configuration information of protocol layer of the default DRB of the first link.

10. The device according to claim 9, wherein the configuration information of the protocol layer of the default DRB of the first link comprises at least one of a service data adaptation protocol (SDAP) layer configuration, a packet data convergence protocol (PDCP) layer configuration, a radio link control (RLC) layer configuration, a logical channel (LCH) configuration, or an RLC channel configuration of the default DRB of the first link.

11. A communications device, comprising:
at least one processor, and
one or more non-transitory compute readable memories coupled to the at least one processor and storing programming instructions for execution by the at least one processor to operate as a first network device or as an apparatus included in the first network device, the programming instructions including instructions for:
determining configuration information of a default data radio bearer (DRB) of a first link, wherein the first link is a direct wireless communications link between a first terminal device and another terminal device, wherein the first terminal device is a transmit end of a first vehicle-to-everything (V2X) data packet, and wherein the configuration information of the default DRB of the first link comprises V2X data packet parameter information corresponding to the default DRB of the first link, wherein the parameter information comprises a type of communication; and
sending the configuration information of the default DRB of the first link to the first terminal device;
wherein the configuration information of the default DRB of the first link comprises first indication information, and wherein the first indication information indicates that the configuration information is the configuration information of the default DRB of the first link.

12. A communications system, wherein the system comprises a first terminal device and a first network device:
wherein the first network device is configured to:
determine configuration information of a default data radio bearer (DRB) of a first link, wherein the first link is a direct wireless communications link between a first terminal device and another terminal device, and wherein the first terminal device is a transmit end of a first vehicle-to-everything (V2X) data packet; and
send the configuration information of the default DRB of the first link to the first terminal device, wherein the configuration information of the default DRB of the first link comprises first indication information, and the first indication information is used to indicate that the configuration information is the configuration information of the default DRB of the first link, and wherein the configuration information of the default DRB of the first link comprises V2X data packet parameter information corresponding to the default DRB of the first link, wherein the parameter information comprises a type of communication; and
wherein the first terminal device is configured to:
obtain configuration information of the default DRB of the first link; and
map a first V2X data packet that meets a preset condition to the default DRB of the first link, wherein the preset condition being met comprises the first terminal device not storing a DRB of the first link that corresponds to the first V2X data packet.

13. The communications system according to claim 12, wherein the first terminal device not storing the DRB of the first link that corresponds to the first V2X data packet comprises the first terminal device being unable to obtain same V2X data packet parameter information from a stored DRB mapping rule, wherein the DRB mapping rule comprises V2X data packet parameter information corresponding to a DRB, and wherein the DRB of the first link comprises a DRB that can be mapped according to the stored DRB mapping rule.

14. The communications system according to claim 12, wherein the first terminal device is further configured to perform at least one of:
receive the configuration information of the default DRB of the first link from a first network device; or
obtain stored preconfigured configuration information of the default DRB of the first link.

15. The communications system according to claim 14, wherein the configuration information of the default DRB of the first link from the first network device is carried in a system information broadcast or radio resource control (RRC) dedicated signaling, and wherein a priority of configuration information of the default DRB of the first link in the RRC dedicated signaling is higher than a priority of configuration information of the default DRB of the first link in the system information broadcast.

16. The communications system according to claim 12, wherein the configuration information of the default DRB of the first link comprises at least one of DRB configuration information required by a transmit end of the V2X data packet or DRB configuration information required by a receive end of the V2X data packet, and wherein a second terminal device is a receive end of the first V2X data packet.

17. The communications system according to claim 16, wherein the V2X data packet is a unicast data packet, and wherein the configuration information of the default DRB of the first link comprises the DRB configuration information required by the transmit end of the V2X data packet and required by the receive end of the V2X data packet.

18. The communications system according to claim 12, wherein the type of communication comprises at least one of broadcast communication, multicast communication, or unicast communication.

19. The communications system according to claim 12, wherein the configuration information of the default DRB of the first link further comprises at least one of identification information of the default DRB of the first link or configuration information of protocol layer of the default DRB of the first link.

20. The communications system according to claim 19, wherein the configuration information of the protocol layer of the default DRB of the first link comprises at least one of a service data adaptation protocol (SDAP) layer configuration, a packet data convergence protocol (PDCP) layer configuration, a radio link control (RLC) layer configuration, a logical channel (LCH) configuration, or an RLC channel configuration of the default DRB of the first link.

* * * * *